(12) United States Patent
King et al.

(10) Patent No.: US 7,064,706 B2
(45) Date of Patent: Jun. 20, 2006

(54) METHOD AND APPARATUS FOR ASSISTED GPS

(75) Inventors: Thomas M. King, Tempe, AZ (US); George J. Geier, Scottsdale, AZ (US); Yilin Zhao, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 69 days.

(21) Appl. No.: 10/161,001

(22) Filed: Jun. 3, 2002

(65) Prior Publication Data

US 2003/0011511 A1 Jan. 16, 2003

Related U.S. Application Data

(60) Division of application No. 09/480,380, filed on Jan. 10, 2000, now Pat. No. 6,429,808, which is a continuation-in-part of application No. 09/438,204, filed on Nov. 12, 1999, now Pat. No. 6,313,787.

(51) Int. Cl.
*G01S 5/14* (2006.01)

(52) U.S. Cl. ............................ 342/357.02; 342/357.03; 342/357.1

(58) Field of Classification Search ............ 342/357.02, 342/357.03, 357.09, 357.1, 357.15; 701/215
See application file for complete search history.

(56) References Cited

U.S. PATENT DOCUMENTS

| | | | | |
|---|---|---|---|---|
| 5,323,322 A | * | 6/1994 | Mueller et al. | ............. 701/215 |
| 5,408,237 A | * | 4/1995 | Patterson et al. | ........... 342/354 |
| 5,436,632 A | * | 7/1995 | Sheynblat | ............. 342/357.03 |
| 5,600,329 A | * | 2/1997 | Brenner | ................ 342/357.03 |
| 5,731,787 A | | 3/1998 | Sheynblat | |
| 5,831,576 A | * | 11/1998 | Sheynblat | ............. 342/357.03 |
| 5,913,170 A | * | 6/1999 | Wortham | ................... 455/457 |
| 6,018,818 A | * | 1/2000 | Sheynblat | ................... 714/811 |
| 6,040,798 A | * | 3/2000 | Kinal et al. | ............ 342/357.01 |
| 6,138,074 A | * | 10/2000 | Gower et al. | ............... 701/215 |
| 6,188,351 B1 | * | 2/2001 | Bloebaum | .............. 342/357.15 |
| 6,317,688 B1 | * | 11/2001 | Bruckner et al. | ........... 701/213 |

FOREIGN PATENT DOCUMENTS

| | | | |
|---|---|---|---|
| GB | 2264837 A | * | 9/1993 |
| GB | 2 347 035 A | | 8/2000 |
| WO | WO 01/11382 A1 | | 2/2001 |

OTHER PUBLICATIONS

Ober, P. B. et al, "AUGUR: RAIM for dummies", 1999 IEEE Proceedings of Aerospace Conference, Mar. 1999, pp. 395-405, vol. 2.*

(Continued)

*Primary Examiner*—Gregory C. Issing
(74) *Attorney, Agent, or Firm*—Roland K. Bowler, II

(57) ABSTRACT

A cellular network protocol that maintains the reliability of assisted GPS based positioning is taught. An Integrity Monitor (IM) informs mobile stations, their users, or networks of measurement quality and it warns them of failing and failed GPS satellites by isolating them from the effects of these failures. Whenever an unhealthy satellite is detected, its corresponding assistance data will be excluded for delivery or for position determination. In other words, there are two specific aspects to the Integrity Monitor (IM). For DGPS users, it predicts the reliability or quality of the DGPS corrections. For all users, it isolates the mobile position calculation from the effects of GPS satellite failures. The UDRE parameter, nominally output by a reference DGPS receiver, is used to communicate the DGPS quality information, and DGPS corrections are simply excluded for failed satellites. For autonomous GPS users, a special integrity message is required and defined to communicate the satellite failure status information.

23 Claims, 19 Drawing Sheets

OTHER PUBLICATIONS

Moore, T. et al, "Satellite Navigation information Services", IEE Colloquim on Implementation of GNSS, 1995, pp. 6/1-6/5.*

Virball, V. Glenn et al, "A GPS Integrity Channel Based Fault Detection and Exclusion Algorthm Using Maximum Solution Sepration", IEEE Position, Location, and Navigation Symposium, Apr. 1994, pp. 747-754.*

Kinal, George, et al, "INMARSAT Integrity Channels for Global Navigation Satellite Systems", IEEE Aeorspace and Electronics Systems Magazine, Aug. 1992, pp. 22-25.*

Stein, B.A. et al, "Global Positioning System Integrity Channel: A System Design Analysis", IEEE Digital Avionics Systems Conference, Oct. 1990, pp. 576-581.*

Kovach et al, "The ARINC Veracious Differential Reference Station Concept and Status," National Telesystems Conf. —Commercial Applications and Dual Use Technology, Jun. 1993, pp. 143-152.*

Kozel, Barbara et al, "Evaluation of GPS Positioning Service Autonomous Integrity Monitoring Performances for Military Applications," IEEE Position, Location and Navigation Symposium Apr. 1996, pp. 83-91.*

"RTCM Recommended Standards for Differential NAVSTAR GPS Service Version 2.0," RTCM Special Committee No. 104, Ja 1, 1990, pp. 1-1 to 4-34.*

Kinal, George et al, "INMARSAT Integrity Channels for Global Navigation Satellite Systems," IEEE Aerospace and Electronics Systems Magazine, Aug. 1992, pp. 22-25.*

Hegarty, Chris et al, "Slmulation of a Civil Integrity Network," IEEE PLANS '92, Mar. 1992, pp. 457-463. p.*

Spalding, Joseph, et al, "Differential GPS Integrity Monitor," IEEE PLANS '94, Apr. 1994, pp. 225-232.*

Van Dyke, Karen, "The World After SA: Benefits to GPS Integrity," IEEE PLANS 2000, Mar. 2000, pp. 387-394.*

Leopold, Raymond, "Low-Earth Orbit Global Cellular Communications Network," IEEE International COnf. on Communications, Jun. 1991, pp. 1108-1111, vol. 2.*

Dietrich, Fred et al, "The GLOBALSTAR Cellular Satellite System," IEEE Transactions on Antennas and Propagation, vol. 46, No. 6, Jun. 1998, pp. 935-942.*

Ericsson/Snaptrack, "Evaluation Worksheet for Assisted GPS," T1P1.5/98-132r3, Jun. 1998, pp. 1-15.*

* cited by examiner

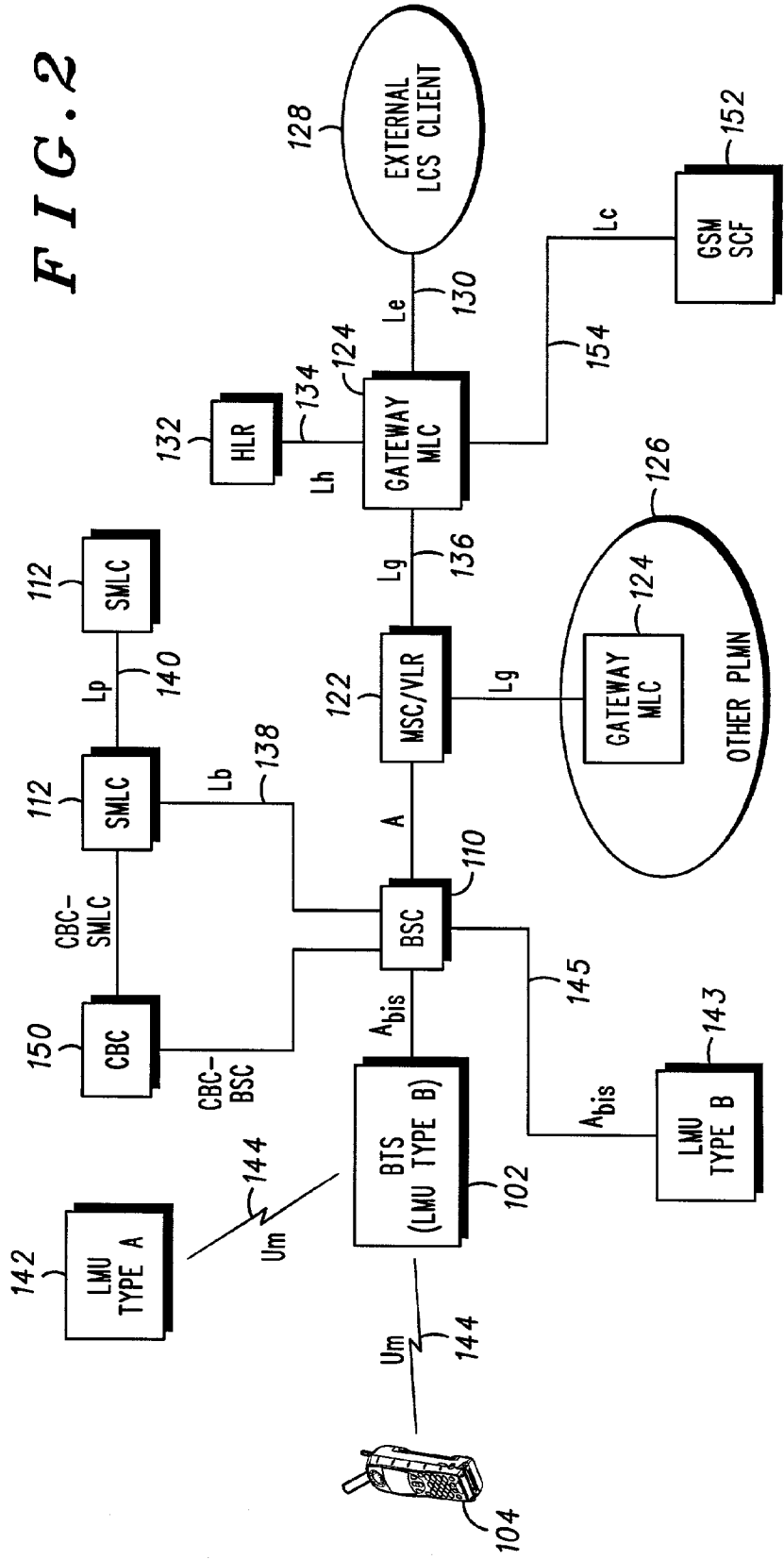

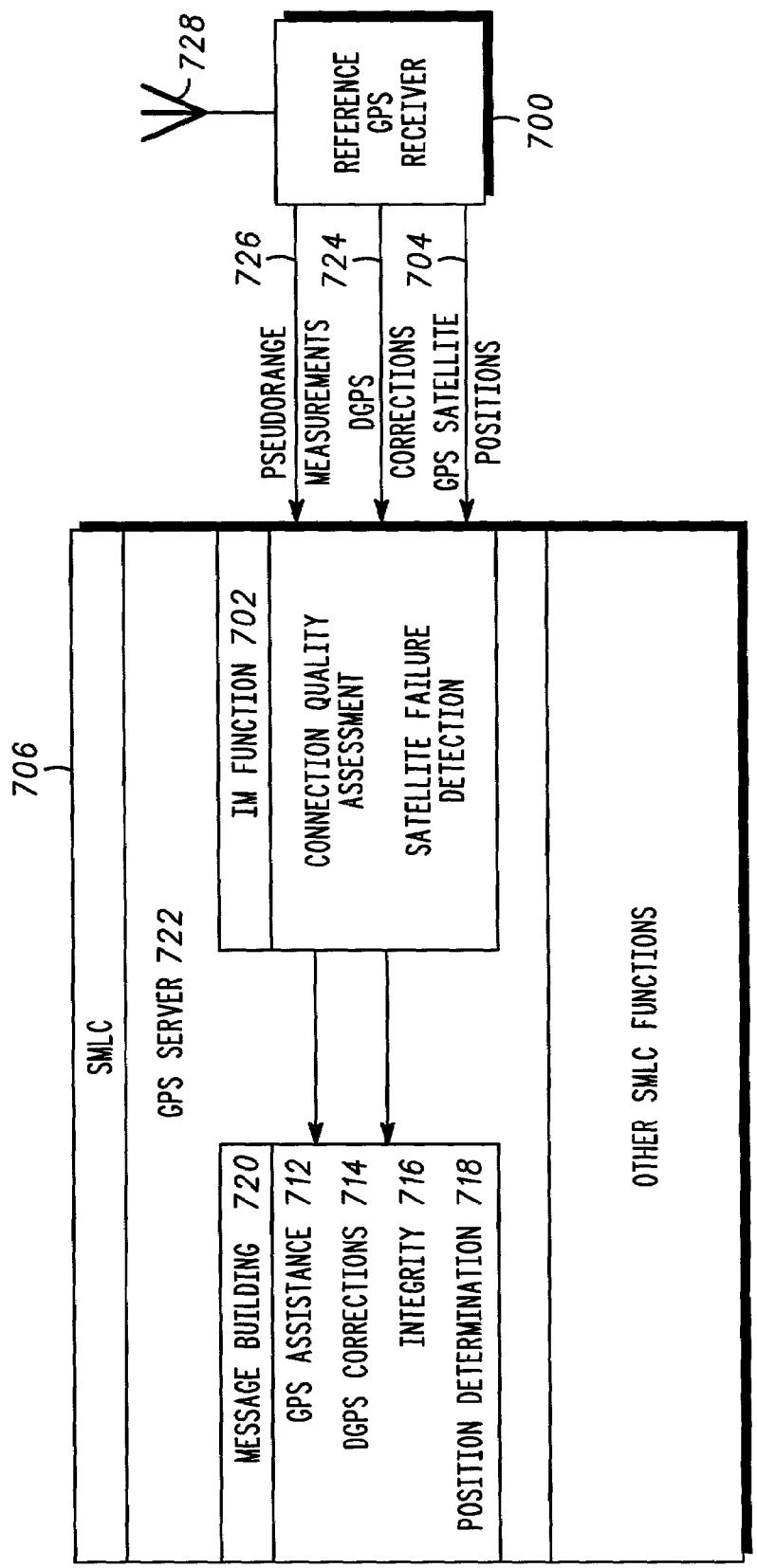

METHOD AND APPARATUS FOR ASSISTED GPS

CROSS REFERENCE TO RELATED APPLICATIONS

The present application is a divisional application of U.S. application Ser. No. 09/480,380 filed on 10 Jan. 2000 now U.S. Pat. No. 6,429,808, which is continuation-in-part of prior U.S. application Ser. No. 09/438,204, filed on 12 Nov. 1999, now U.S. Pat. No. 6,313,787, all of which are incorporated herein by reference, and from which priority is claimed.

BACKGROUND OF THE INVENTION

The present inventions relate generally to radio communication systems, and more particularly to methods and apparatuses for maintaining the integrity of mobile handset location determination in a radio communication system, and methods therefor.

Radio communication systems generally provide two-way voice and data communication between remote locations. Examples of such systems are cellular and personal communication system (PCS) radio systems, trunked radio systems, dispatch radio networks, and global mobile personal communication systems (GMPCS) such as satellite-based systems. Communication in these systems is conducted according to a pre-defined standard. Mobile stations, also known as handsets, portables or radiotelephones, conform to the system standard to communicate with one or more fixed base stations.

It is desirable to obtain and communicate physical locations of mobile stations within a system, such as radiotelephone handsets within a cellular system. In addition, the United States Federal Communications Commission (FCC) has required that cellular handsets must be geographically locatable by the year 2001. This capability is desirable for emergency systems such as Enhanced 911 (E911). The FCC requires stringent accuracy and availability performance objectives and demands that cellular handsets be locatable within 100 meters 67% of the time for network based solutions and within 50 meters 67% of the time for handset based solutions.

Further, with location information available for mobile stations, position-dependent services and messaging including advertising can be tailored to the handset user responsive to the location of the handset.

Current generations of radio communication have only limited mobile station location determination capability. In one technique, the position of the mobile station is determined by monitoring mobile station transmissions at several base stations. From time of arrival measurements, the mobile station's position can be calculated. However, the precision of this technique is limited and, at times, may be insufficient to meet FCC requirements.

In another technique, each mobile station is equipped with a receiver suitable for use with a global satellite navigation system such as the Global Positioning System (GPS). The construction and operation of receivers suitable for use with GPS are described in U.S. Pat. Nos. 5,175,557 and 5,148,452, both of which are assigned to the assignee of the present invention. The GPS receiver detects transmissions from a constellation of GPS satellites orbiting the Earth. Using data and timing from the transmissions, the GPS receiver calculates the positions of the satellites and from those positions, its own position. A GPS satellite in orbit moves at about 4,000 meters per second. The satellite has location data defined by a parameter $X(t)$ and velocity data defined by a parameter $V(t)$. The parameters $X(t)$ and $V(t)$ are three-dimensional position and velocity vectors for this satellite and are referenced to an earth-centered, earth-fixed Cartesian coordinate system. The GPS system includes 24 satellites, several of which may be in view of the mobile station at any one time. Each satellite broadcasts data according to pre-defined standard formats and timings.

Traditionally, the satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second (bps). The constants contained in the ephemeris data coincide with Kepler orbit constants requiring many mathematical operations to turn the data into position and velocity data. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing. A receiver must perform this computation every second for every satellite, for up to twelve satellites.

Thus, the computational load for performing the traditional calculation is significant. The handset must include a high-level processor capable of the necessary calculations. Such processors are relatively expensive and consume large amounts of power. As a portable device for consumer use, a mobile station is preferably inexpensive and operates at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile station must be continuously energized. Preferably, to maintain battery life in portable receivers and transceivers such as mobile cellular handsets, circuits are de-energized as much as possible. The long GPS acquisition time can rapidly deplete the battery of a mobile station. In any situation and particularly in emergency situations, the long GPS acquisition time is inconvenient.

In Assisted GPS (referred to as A-GPS), communications network and infrastructure are used to assist the mobile GPS receiver, either as a standalone device or integrated with a mobile station (MS). The basic idea of A-GPS is to establish a GPS reference network (or a wide-area DGPS network) whose receivers have clear views of the sky and can operate continuously. This reference network is also connected with the cellular infrastructure, and continuously monitors the real-time constellation status and provides precise data for each satellite at a particular epoch time. As one skilled in the art would recognize, the GPS reference receiver and its server (or position determination entity) could be located at any surveyed location with an open view of the sky so long as it can be linked to the network or co-located with another network node. For instance, the GPS server could be separated with the reference receiver and integrated with a network node. At the request of the mobile phone, network or location service clients, the assist data derived from the GPS reference network are transmitted via the communications network to the mobile phone GPS receiver to aid fast start-up, to increase the sensor sensitivity, and to reduce the power consumption. At least three modes of operations can be supported: "MS-assisted," "MS-based," and "autonomous." For MS-assisted GPS, the mobile receiver position is calculated at the network. Typically, the MS needs to receive the assistance data such as GPS time, Doppler and code phase search window, and to transmit pseudorange data back to the network. For MS-based GPS, the mobile receiver position is calculated at the handset. Typically, the MS needs to receive the assistance data such as GPS time, ephemeris and clock correction, and transmit the calculated position back if required. For autonomous GPS, its position is also calculated at the handset with very limited assistance from the network (or no assistance at all), which can also been very loosely classified under MS-based GPS. Typically, the receiver position is determined independently without network assistance.

For GPS applications, position errors are contributed by the satellite clock, satellite orbit, ephemeris prediction, ionospheric delay, tropospheric delay, and selective availability (SA). To reduce these errors, range and range-rate corrections can be applied to the raw pseudorange measurements in order to create a position solution that is accurate to a few meters in open environments. One such correction technique is differential GPS (DGPS). For MS-assisted GPS, corrections can be applied directly at the network or its GPS server to pseudorange and pseudorange rate received from the MS. For MS-based GPS, corrections must be transmitted to the mobile receiver either via "point-to-point" or "broadcast" ("point-to-multipoint") mode. Note that A-GPS may operate with or without differential GPS corrections: the corrections are generally required for those applications with the most demanding accuracy requirements (e.g., E911).

The location accuracy of the three GPS modes of operation can degrade substantially when undetected GPS satellite failures are present: such failures, though rare, can render the positioning information derived by a mobile handset completely unusable. Although the GPS Control Segment monitors the health of the GPS satellites, this activity is not performed continuously, and may require more than 30 minutes to be communicated to GPS users. In addition, for A-GPS operating in a differential mode, unexpected multipath at the DGPS receiver surveyed site can lead to larger than nominal location errors, independent of the health of the GPS constellation.

Accordingly, there is a need for an improved method and apparatus to maintain the integrity of location determinations in a radio communication system.

BRIEF DESCRIPTION OF THE DRAWINGS

FIG. 2 is a block digram of a cellular radiotelephone system architecture capable of supporting Location Services (LCS) in accordance with the preferred embodiment of the Assisted GPS radiotelephone system of FIG. 1.

FIG. 13 is a diagram of an Integrity Monitor (IM) for cellular infrastructure in accordance with the preferred embodiment of the present invention.

DETAILED DESCRIPTION

Figure 1:
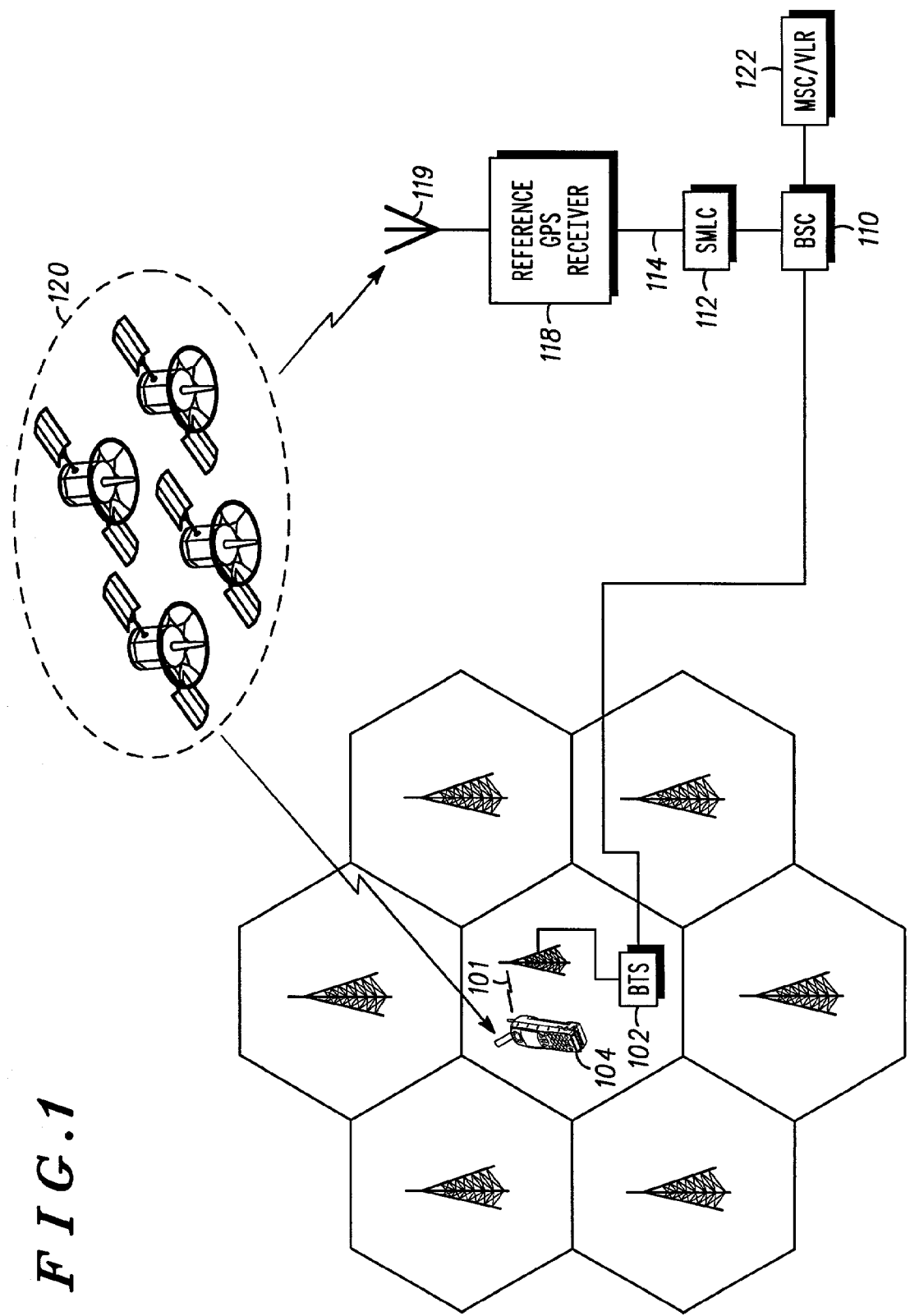
FIG. 1 is a system diagram of an Assisted Global Positioning System (GPS) cellular radiotelephone system in accordance with a preferred embodiment of the present invention.

An improved system and method of Assisted GPS receiver location determination and integrity maintenance are described. The system of the present invention includes novel architectures, which can determine mobile station location with a high degree of accuracy and tolerance of off-nominal error conditions. Referring to FIG. 1, as an application example, a GSM cellular network is depicted utilizing the system diagram of an Assisted GPS location system in accordance with the preferred embodiment of the present invention. This is a system with a Base Station Subsystem (BSS)-based Serving Mobile Location Center (SMLC) 112. The reference GPS receiver 118 is located at a surveyed location with SMLC 112 and has an open view of the sky in order to facilitate generation of appropriate assistance and corrections data. In this architecture, it implies that the GPS server is an integral part of the SMLC 112. Alternatively, this server cold also be an integral part of the reference GPS receiver 118 itself. Optionally, as one skilled in the art would recognize, the GPS reference receiver 118 and its server (position determination entity) could be located at any surveyed location with an open view of the sky so long as it can be coupled via serial link 114 to the network or co-located with another network node. For instance, the GPS server could be a separate entity or an integral part of any other network node. SMLC 112 is coupled to Base Transceiver Station (BTS) 102 via Base Station Controller (BSC) 110. The BSC 110 is also coupled to a Mobile services Switching Center (MSC) and Visitor Location Register (VLR) 122 in a manner well known in the art.

The GPS reference receiver 118 receives and tracks signals from multiple GPS satellites 120 in order to generate the assistance data, which are selectively sent to location-capable mobile stations (handsets) 104, depending on the specific GPS mode in operation. The assistance data can include reference location, reference time, GPS time, Doppler, code phase search window, ephemeris and clock correction, ionosphere, Universal Time Coordinate (UTC), Almanac, DGPS corrections, and many other items. The differential correction data which is generated by the GPS reference receiver 118 is preferably generated for all GPS satellites 120 within view of the GPS reference receiver antenna 119, to maximize the mobile handset coverage.

As described above, the SMLC 112 collects the assistance data and prepares separate GPS assistance messages to be modulated on the cellular carrier signal 101 and sent to multiple users 104. Note that a main message set of the assistance data is collectively referred to as "ephemeris data" in U.S. patent application Ser. No. 09/438,204, entitled "Method and Apparatus for Assisted GPS Protocol" filed Nov. 12, 1999, and assigned to the assignee of the present invention. The specific message formats vary as a function of the transmission mode. The message structures for both "point-to-point" and "broadcast" (or "point-to-multipoint") modes of operation are described in detail later in the text.

The SMLC 112 also performs the computations necessary to ensure the integrity of the location information derived by and for all mobile stations. The purpose of IM is to inform mobile stations, their users, or networks of measurement quality and to warn them failing and failed GPS satellites by isolating them from these failures. It should operate effectively with both broadcast and point-to-point protocols. One simple method is that whenever an unhealthy satellite is detected, its corresponding assistance data will be excluded for delivery or for position determination, which means that its ill effect on the solution quality will be eliminated. Additionally, for DGPS users, the UDRE parameters within the DGPS messages provide a means for communicating this information to mobiles deriving a position fix using GPS. For non-DGPS users, including autonomous users, as presented in IM messages later, other mechanisms must be developed to isolate all GPS users from the effects of GPS satellite failures.

Recent cellular systems include location service (LCS) and related technologies, and many architectures, protocols and procedures are still in development, such as logical LCS architecture, signaling protocol and interfaces, network location procedures and positioning procedures. Accordingly, while a BSS based GSM cellular network having LCS and related technologies as described in GSM Standard 03.71 (Functional Description) has been presented hereinabove, the Assisted GPS integrity maintenance (or monitor) and protocol of the present invention are flexible enough to be applied to any present and future LCS architecture, protocols, procedures, and access techniques such as Analog, GSM, TDMA, and CDMA, including CDMA2000, W-CDMA, UMTS, and many other variants.

Referring next to FIG. 2, an architecture capable of supporting the location service (LCS) is described. The LCS in accordance with the preferred embodiment of the present invention is logically implemented on the GSM structure through the addition of one network node, the Mobile Location Center (MLC). A generic BSS based SMLC 112 is shown in this figure. This architecture can be combined to produce LCS architecture variants.

The Base Station System (BSS) is involved in the handling of various positioning procedures. Specific BSS functionality is specified in each of the positioning procedures section. The Gateway Mobile Location Center (GMLC) 124 contains functionality required to support LCS. In one Public Land Mobile Network (PLMN) 126, there may be more than one GMLC 124. The GMLC 124 is the first node an external LCS client 128 accesses in a GSM PLMN, i.e. the Le (interface between External User and MLC) 130 reference point is supported by the GMLC 124. An external LCS client 128 could be an entity requesting identification of a location of a particular mobile station (MS) 104 or particular mobile stations 104. The GMLC 124 may request routing information from a Home Location Register (HLR) 132 via the Lh interface (between MLC and HLR) 134. After performing registration authorization, it sends positioning requests to and receives final location estimates from the MSC/VLR 122 via the Lg interface (between GMLC and MSC/VLR) 136.

The Serving Mobile Location Center (SMLC) 112 contains functionality required to support LCS. In one PLMN, there may be more than one SMLC 112. The SMLC 112 manages the overall coordination and scheduling of resources required to perform positioning of a mobile. It also calculates the final location estimate and accuracy. Two types of SMLC 112 are possible. An SMLC 112 in accordance with the preferred embodiment of the present invention is a BSS based SMLC: supports the Lb interface 138 between the SMLC 112 and the Base Station Controller (BSC) 110.

A BSS based SMLC 112 supports positioning via signaling on the Lb interface 138 to the BSC 110 serving the target MS 104. Both types of SMLC 112 may support the Lp interface 140 to enable access to information and resources owned by another SMLC 112. The SMLC 112 controls a number of Location Measurement Units (LMUs) 142, 143 for the purpose of obtaining radio interface measurements to locate or help locate MS subscribers in the area that it serves. The SMLC 112 is administered with the capabilities and types of measurement produced by each of its LMUs 142, 143. Signaling between a BSS based SMLC 112 and LMU 142, 143 is transferred via the BSC 110 that serves or controls the LMU using the Lb interface 138 and either the Um interface 144 for a Type A LMU 142 or the Abis interface 145 for a Type B LMU 143. The SMLC 112 and GMLC 124 functionality may be combined in the same physical node, combined in existing physical nodes, or reside in different nodes.

For Location Services, when a Cell Broadcast Center (CBC) 150 is associated with a BSC 110, the SMLC 112 may interface to a CBC 150 in order to broadcast assistance data using existing cell broadcast capabilities. The SMLC 112 shall behave as a user, Cell Broadcast Entity, to the CBC 150. The conventional operation of the CBC 150 is described in GSM Standard 03.41. In addition, the MS 104 may be involved in the various positioning procedures.

An LMU 142, 143 makes radio measurements to support one or more positioning methods. These measurements fall into one of two categories: location measurements specific to one MS 104 used to compute the location of that MS 104, and assistance measurements specific to all MSs 104 in a certain geographic area. All location and assistance measurements obtained by an LMU 142, 143 are supplied to a particular SMLC 112 associated with the LMU 142, 143. Instructions concerning the timing, the nature and any periodicity of these measurements are either provided by the SMLC 112 or are pre-administered in the LMU 142, 143. There are two types of LMU, a Type A LMU 142 is an LMU that is accessed over the normal GSM air interface Um 144 and a Type B LMU 143 is an LMU that is accessed over the Abis interface 145.

The MSC 122 contains functionality responsible for mobile station subscription authorization and managing call-related and non-call related positioning requests of GSM LCS. The MSC is accessible to the GMLC 124 via the Lg interface 136.

The HLR 132 contains LCS subscription data and routing information. The HLR 132 is accessible from the GMLC 124 via the Lh interface 134. For roaming MSs 104, the HLR 132 corresponding to that mobile station may be in a different PLMN 126 than the current SMLC 112.

The gsmSCF 152 is a part of the PLMN. The Le interface 154 supports CAMEL access to LCS and is applicable only in Customized Applications for Mobile Network Enhanced Logic (CAMEL) phase three. The procedures and signaling associated with it are defined in GSM Standards 03.78 and 09.02, respectively.

The LCS architecture is intended to support a high degree of flexibility, whereby any physical SMLC 112 can support multiple Lb interfaces 138 (e.g. allowing a BSS based SMLC 112 to serve multiple BSCs 110) and whereby a mixture of different SMLC 112 types can serve a single network or single MSC area. Of course, a mixture of different SMLC types can also serve a single network or single MSC area.

The system architecture depicted in FIGS. 1 and 2 is a BSS architecture. While the preferred embodiment is described in terms of a BSS architecture, the Assisted GPS protocol of the present invention can be enabled on many other system architectures.

Figure 3A:
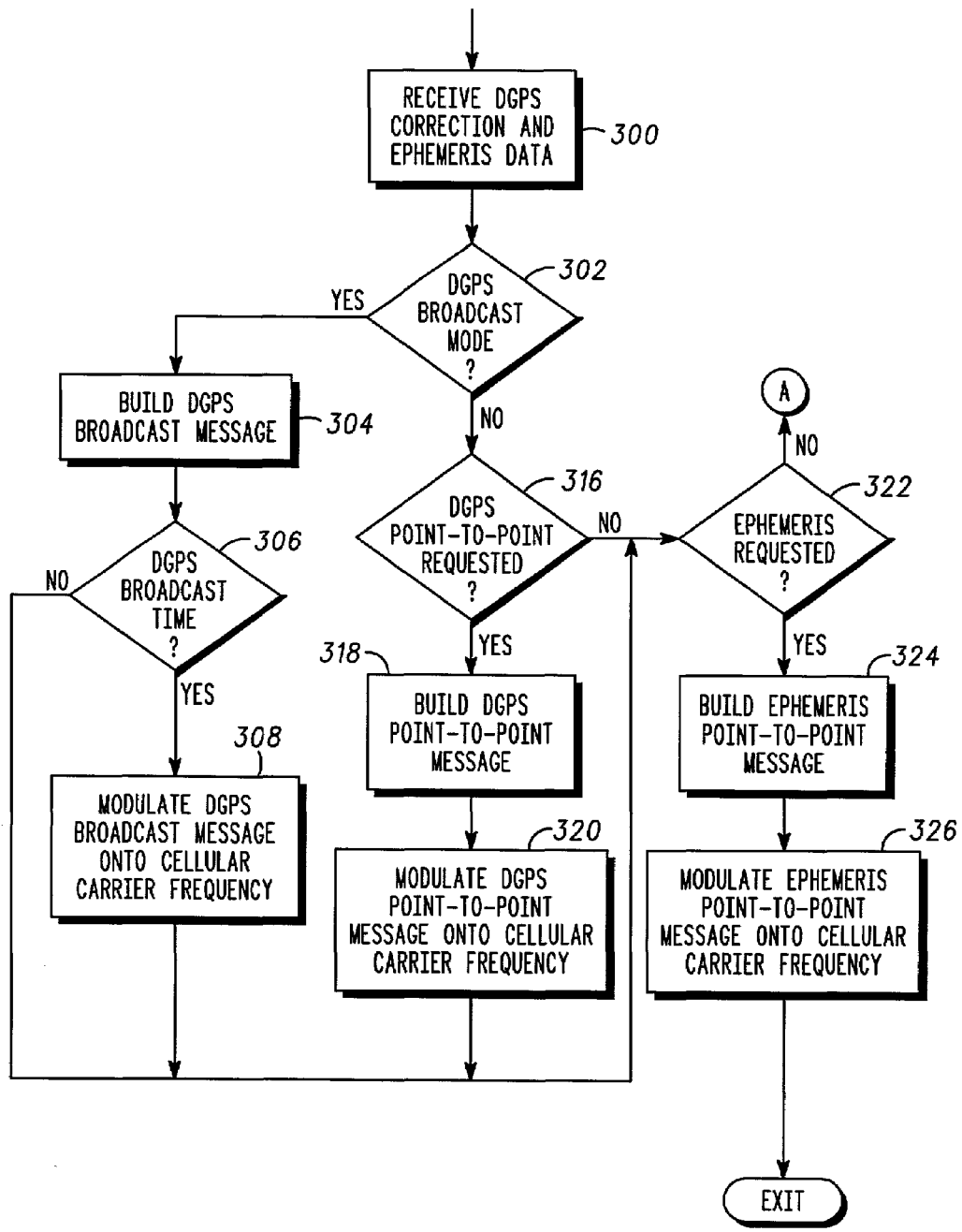
FIGS. 3A and 3B illustrate a flowchart of the operation of the Assisted GPS radiotelephone system of FIG. 1.
Figure 3B:
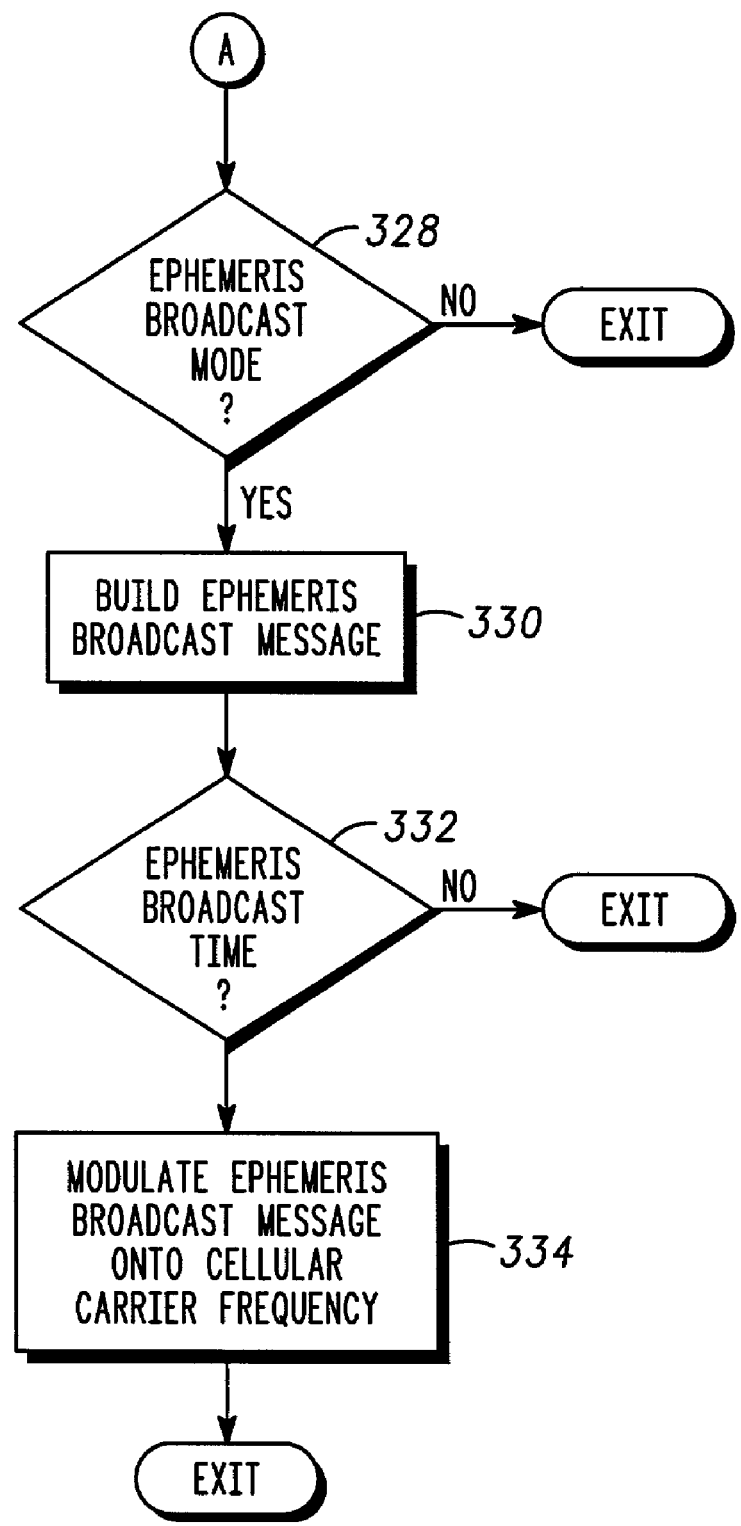

The sequencing of computations and events occurring within the SMLC (actually in the specific part of the SMLC, the GPS server, SMLC will be used thereafter for short) is illustrated in the flowchart appearing in FIG. 3. The process begins with the receipt of differential correction data 300 from the DGPS reference receiver: a serial link is used to transmit the correction data at a nominal output rate (e.g., 0.1–1.0 Hz). Preferably, in accordance with the current invention, the correction data which is generated by the DGPS reference receiver is derived for all sets of ephemeris data (as determined through the Issue Of Data Ephemeris (IODE) word which accompanies each unique ephemeris set). Alternatively, the SMLC itself can perform the necessary calculations if the corrections are computed for only a single IODE. In step 302, a test is made on the current DGPS messaging mode: if the mode is broadcast, the DGPS broadcast message 304 will be built, and if it is determined by the SMLC that it is time to broadcast this message 306, the message will be modulated later onto the cellular carrier frequency 308 for eventual broadcast via CBC throughout the area served by the network. If, on the other hand, a DGPS point-to-point message request has been received 316, this message will be built 318 and modulated onto the cellular carrier frequency for eventual transmission to the handset. Similarly, if a request for a "point-to-point" ephemeris message has been received 322, that message is built 324, and modulated later onto the cellular carrier frequency for eventual transmission to the handset requesting the ephemeris data. Finally, if the ephemeris messaging mode is broadcast 328, that message is built in 330, and a test is made to see if it is time to broadcast this message 332. If it is time to broadcast, the message is modulated later onto the cellular carrier frequency for eventual transmission throughout the area served by the network. It should be noted that the IODE value can also be used to determine how to compress each parameter of the ephemeris and clock correction data. A detailed definition of all the broadcast and point-to-point messages associated with the current invention is provided hereinbelow.

Note that this flowchart describe an example of how the SMLC manages the GPS server duty of position determination and assistance message handling. Ephemeris and DGPS assistance messages are used in this flowchart and FIGS. 9 to 12 discussed hereinbelow. As one skilled in the art would recognize, the principles described here and in FIGS. 9 to 12 could be used for many other assistance messages, such as UTC time, ionosphere, Almanac, and other items built from GPS satellite signals. For MS assisted GPS, one would only need to transmit a simple assistance message, including GPS time, Doppler, Code Phase Search Window, and possible other parameters to the handset. In return, the handset would transmit a set of pseudoranges back so the SMLC could determine the handset position at the network. If a very accurate position is desired, DGPS corrections could be applied before deriving the final position. In addition, with slight modifications as one skilled in the art would recognize, FIGS. 9 to 12 could also been used for autonomous GPS users.

Figure 4:
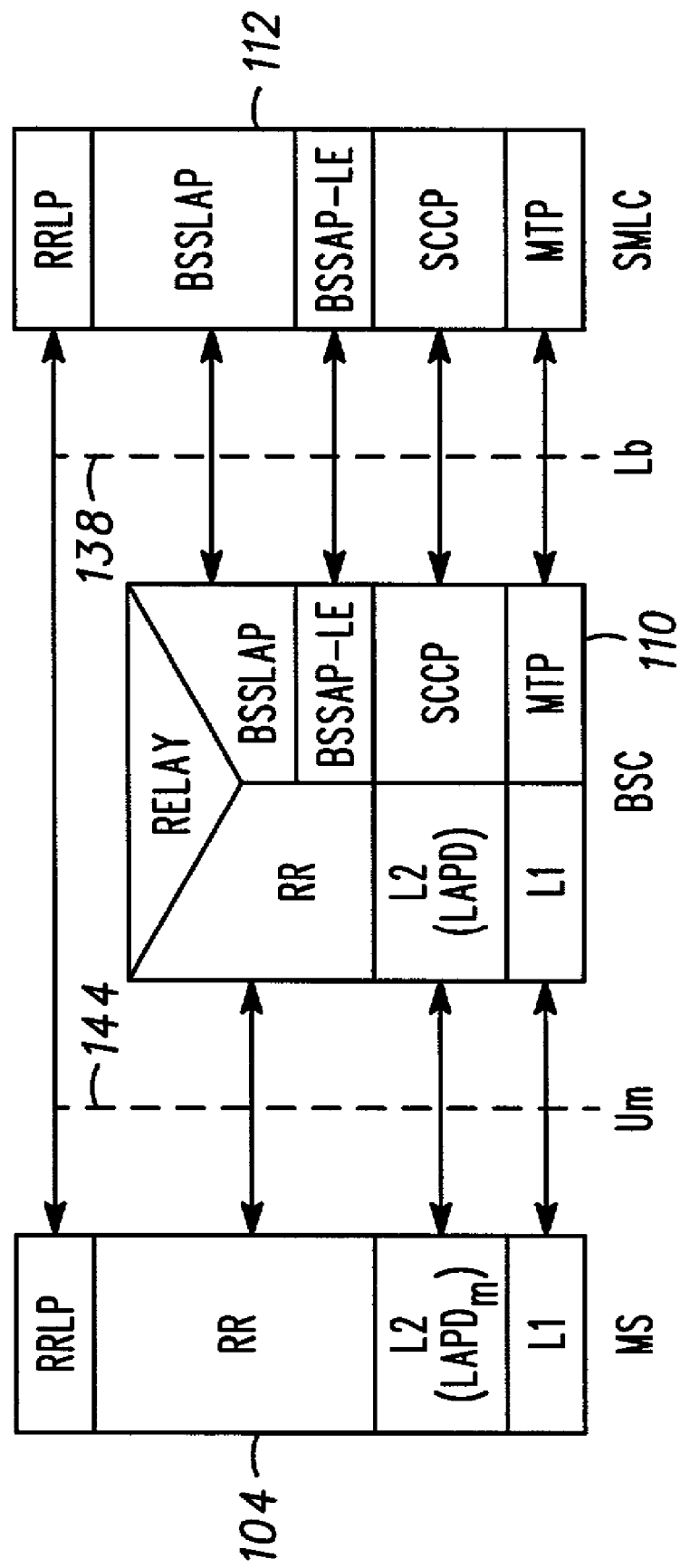
FIG. 4 is a protocol-level flow diagram of the operation of the Assisted GPS radiotelephone system of FIG. 1.

FIG. 4 shows the protocol layers used to support signaling protocols between an SMLC 112 and target MS (mobile station) 104 with a BSS based SMLC 112. Details of signaling between SMLC 112, MSC 122 and BSC 110 are ignored in this depiction.

Many of the protocols depicted in FIG. 4 are protocols typical to a conventional GSM cellular system and are addressed in GSM Standard 01.04. These protocols new to the location services (LCS) are defined as follows: RR stands for Radio Resource; RRLP stands for a RR LCS Protocol to a target MS; Um is the air interface to an LMU; BSSAP-LE stands for Base Station System Application Part-LCS Extension; BSSLAP stands for Base Station System LCS Assistance Protocol; and Lb 138 stands for an interface between the SMLC and the BSC.

Figure 5:
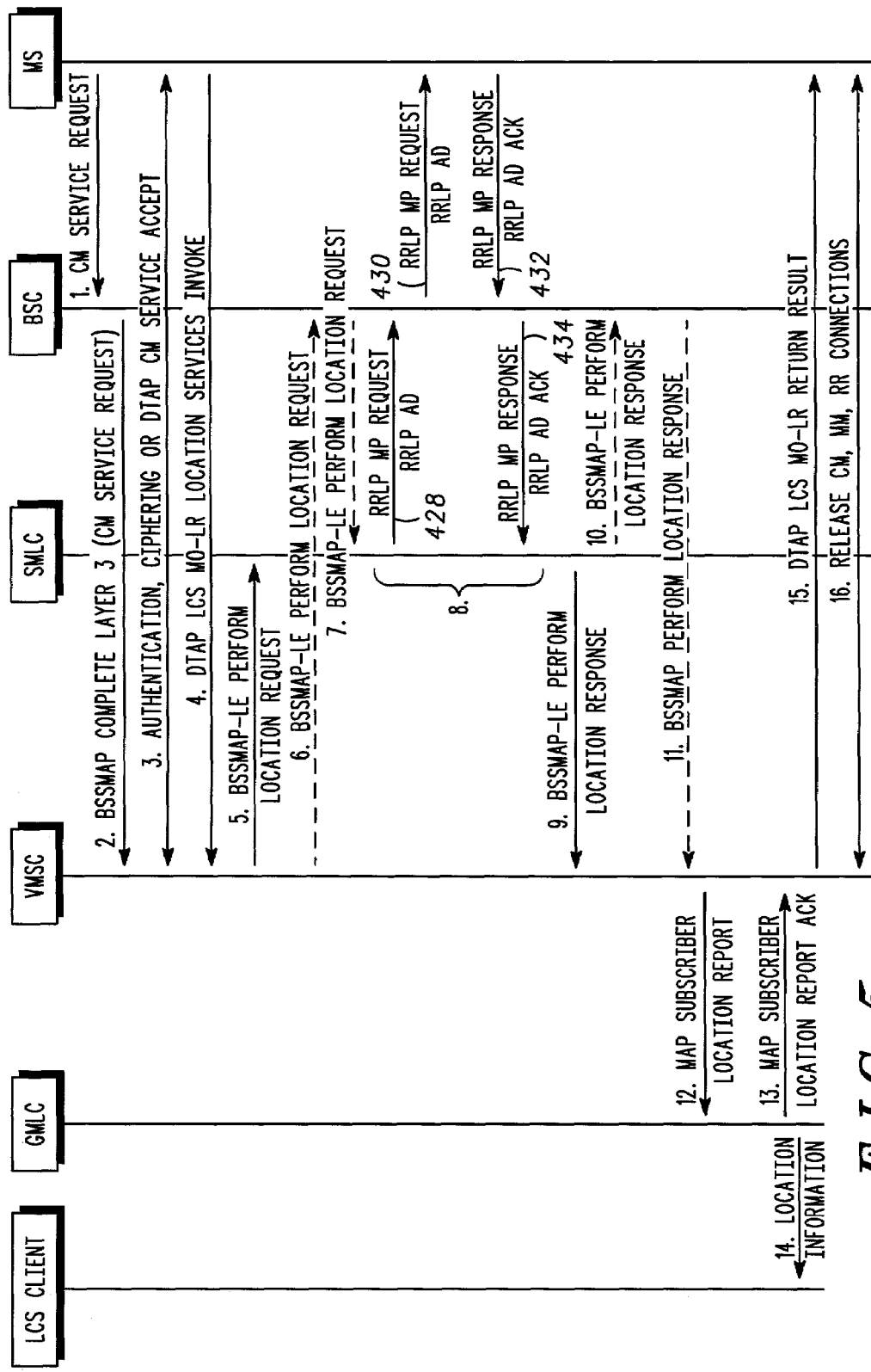
FIG. 5 is a positioning procedures/data flow diagram of a mobile originating location request operating as point-to-point messaging on the Assisted GPS radiotelephone system of FIG. 1 in accordance with the preferred embodiment of the present invention.

Referring to FIG. 5, a data flow diagram of a mobile originating location request operating as point-to-point messaging on the Assisted GPS radiotelephone system of FIG. 1 in accordance with the preferred embodiment of the present invention is described. The data flow depicted allows a mobile station (MS) to request either its own location, location assistance data or broadcast assistance data message ciphering keys from the network. Location assistance data may be used subsequently by the MS to compute its own location throughout an extended interval using a mobile-based position method. The ciphering key enables the MS to decipher other location assistance data broadcast periodically by the network. The MO-LR (Mobile Originating Location Request) after location update request may be used to request ciphering keys or GPS assistance data using the follow-on procedure described in GSM Standard 04.08. The procedure may also be used to enable an MS to request that its own location be sent to another LCS client. The sixteen steps depicted in FIG. 5, other than step eight are discussed in detail in GSM Standard 03.71 and are well-known to those skilled in the art.

In accordance with the present invention, the main Assisted GPS related data flow is indicated in step eight. This signaling flow would be common to all MS based location methods such as MS-based GPS, MS-assisted, and occasionally autonomous GPS. In message 428, the SMLC determines assistance data and sends it in the RRLP ASSISTANCE DATA message to the BSC. In message 430, the BSC forwards the assistance data to the MS in a RRLP ASSISTANCE DATA message. If the assistance data does not fit to one message, messages 428 and 430 can be repeated. In message 432, the MS acknowledges the reception of complete assistance data to the BSC with a RRLP ASSISTANCE DATA Acknowledgement (ACK). The BSC forwards the RRLP ASSISTANCE DATA ACK message to the SMLC as message 434.

In addition to the assistance data flow described above, the positioning procedure flow is also indicated in step eight. The positioning procedure flow comprises the steps of the SMLC determines possible assistance data and sends RRLP MEASURE POSITION request to BSC 428, and the BSC sends the positioning request including the QoS and any assistance data to the MS in a RRLP MEASURE POSITION request 430. Provided location privacy is not enabled in the MS, or enabled but overridden to obtain location for an emergency call, the MS performs the requested GPS measurements. If the MS is able to calculate its own location and this is required, the MS computes a GPS location estimate. Any data necessary to perform these operations will be either provided in the RRLP MEASURE POSITION request or available from broadcast sources. The resulting GPS measurements or GPS location estimate are returned to the BSC in a RRLP MEASURE POSITION response 430. If the MS was unable to perform the necessary measurements, or compute a location, a failure indication is returned instead. The BSC sends measurement results in the MEASURE POSITION response within LCS Information Report message to SMLC 434.

Figure 6:
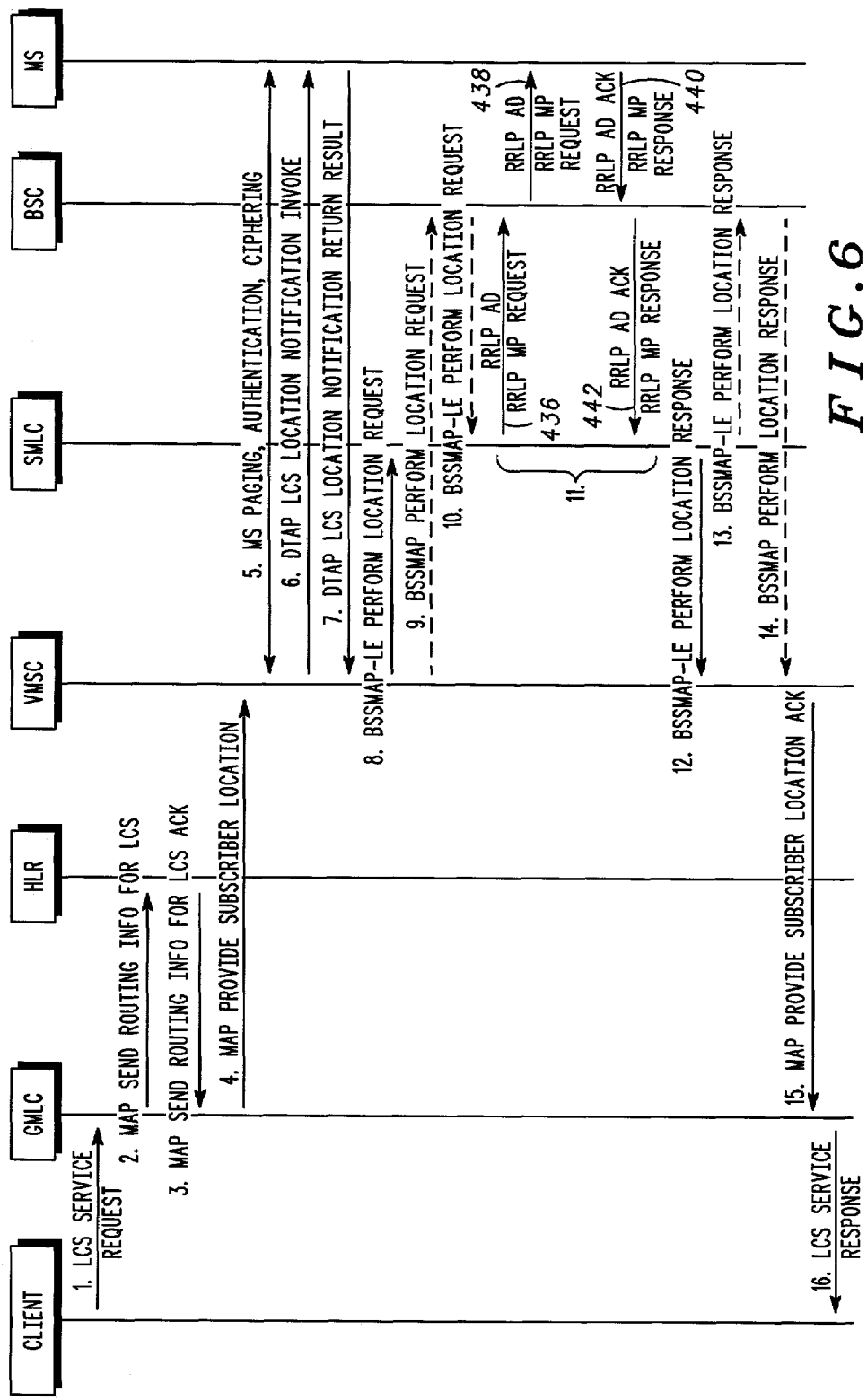
FIG. 6 is a positioning procedures/data flow diagram of a mobile terminating location request operating as point-to-point messaging on the Assisted GPS radiotelephone system of FIG. 1 in accordance with the preferred embodiment of the present invention.

A data flow diagram of a mobile terminating location request operating as point-to-point messaging in an Assisted GPS system in accordance with the preferred embodiment of the present invention is depicted in FIG. 6. This messaging allows an external LCS client, such as an emergency service (ambulance or fire department), to request the current location of a target mobile station. This is termed Mobile Terminating Location Request (MT-LR) and a detailed discussion of the sixteen steps, other than step eleven, can be found in GSM Standard 03.71. When the external LCS client is the North American Emergency Services (NAES), an NAES MT-LR is defined to include only steps 1, 4, 8, 12, 15, 16 and, in accordance with the preferred embodiment of the present invention, step 11.

The Assisted GPS positioning and data flow in accordance with the present invention is indicated in step eleven. This signaling flow is applicable to all MS based location methods including MS-based. MS-assisted, and occasionally autonomous GPS. The assistance data delivery flow with a BSS based SMLC shown in step eleven 436, 438, 440, 442 is the same as the four steps of step eight in FIG. 5 (i.e., steps 428, 430, 432 and 434). Likewise, the data flow has two aspects, assistance data flow and positioning data flow, and the positioning data flow in step eleven of FIG. 6 is the same as that in step eight of FIG. 5.

Figure 7:
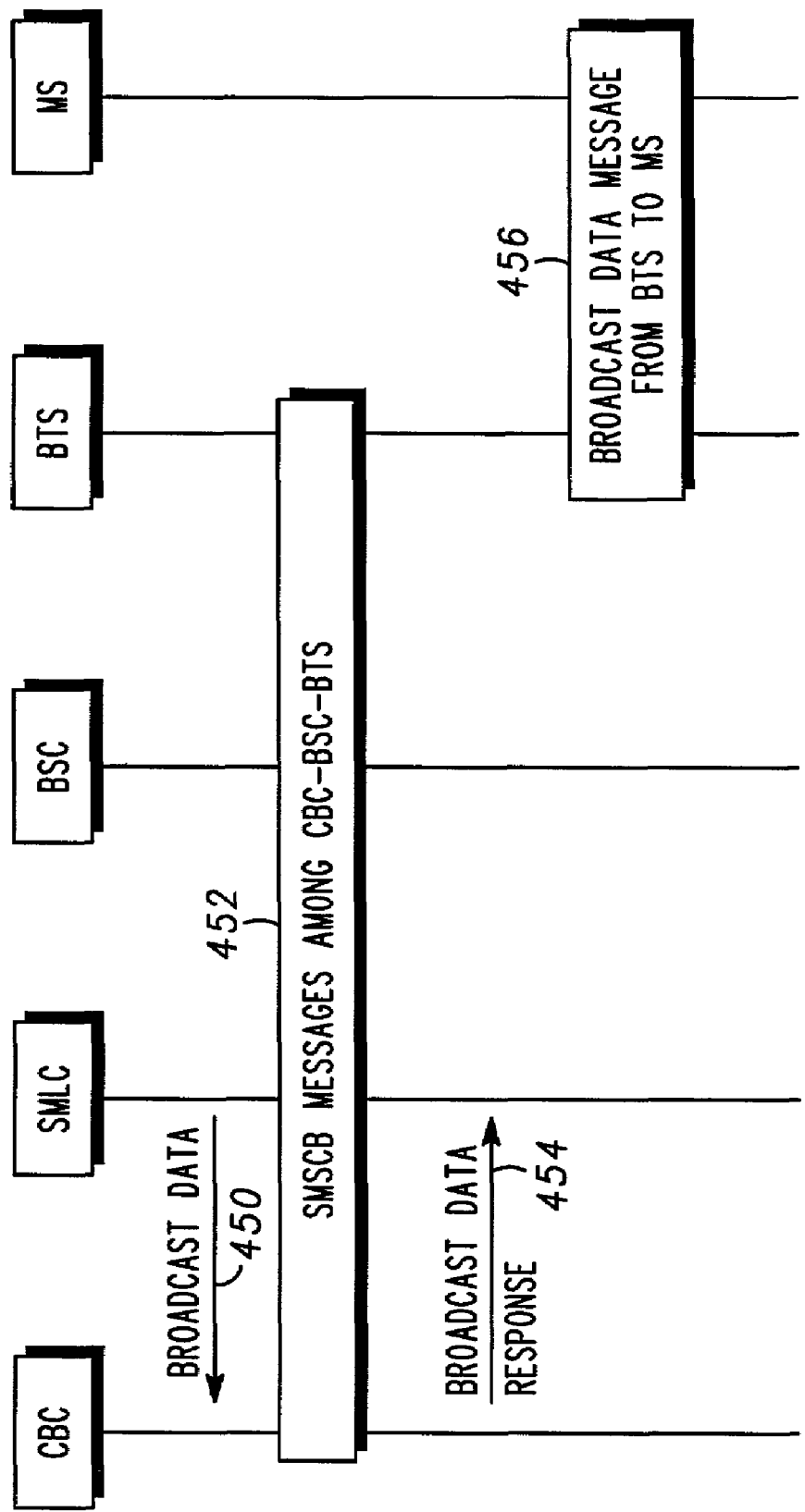
FIG. 7 is a data flow diagram of GPS broadcast messaging on the Assisted GPS radiotelephone system of FIG. 1 in accordance with the preferred embodiment of the present invention.

Referring to FIG. 7, the preferred data flow of GPS broadcast messaging in the Assisted GPS system of the present invention is shown. The broadcast messaging as shown in FIG. 7 is also known as point-to-multipoint assistance data broadcast and, as the methods of FIGS. 5 and 6, the signaling flow of FIG. 7 is applicable to all MS based location methods, including MS-based and autonomous GPS if so desired.

The GPS Assistance Data Broadcast Message can be created in the SMLC and the whole message including the ciphered parts and parameters to control the transfer are transferred from the SMLC to the MS. In accordance with the preferred embodiment of the present invention, Short Message Service Cell Broadcast (SMSCB) Discontinuous Receive (DRX) service is used for the LCS assistance data broadcast. Prior to receiving the first schedule message, the MS should read the first block of each message lot to be able to receive the LCS Broadcast Data or the schedule message. After receiving the schedule message, the MS should receive the LCS Broadcast Data messages according to the schedule information.

The SMLC then sends the complete broadcast message 450 to the CBC with the LCS Broadcast Data message. This LCS Broadcast Data message contains the data to be broadcast as well as parameters which indicate to which BTS the broadcast message is targeted and what time the broadcast should happen. LCS Broadcast Data message may also contain the SMSCB scheduling information which is broadcast to the MS in order that the MS can utilize the SMSCB DRX feature specified in the specification of the GSM Standard 04.12. SMSCB DRX operation is required in order that MS performance can be optimized.

Next, the CBC starts message transfer to BSC and BTS according to GSM 03.41 as shown in messages 452. Next, a LCS Broadcast Data Response message 454 from the CBC to the SMLC is used to indicate that the LCS Broadcast Data has been delivered and the request has been fulfilled. This message is not mandatory. Then, the BTS starts the message transfer 456 to the MS in accordance with GSM Standard 03.41. Other implementations that have an SMLC and/or a CBC integrated into a BSC may use other message signaling.

Figure 8:
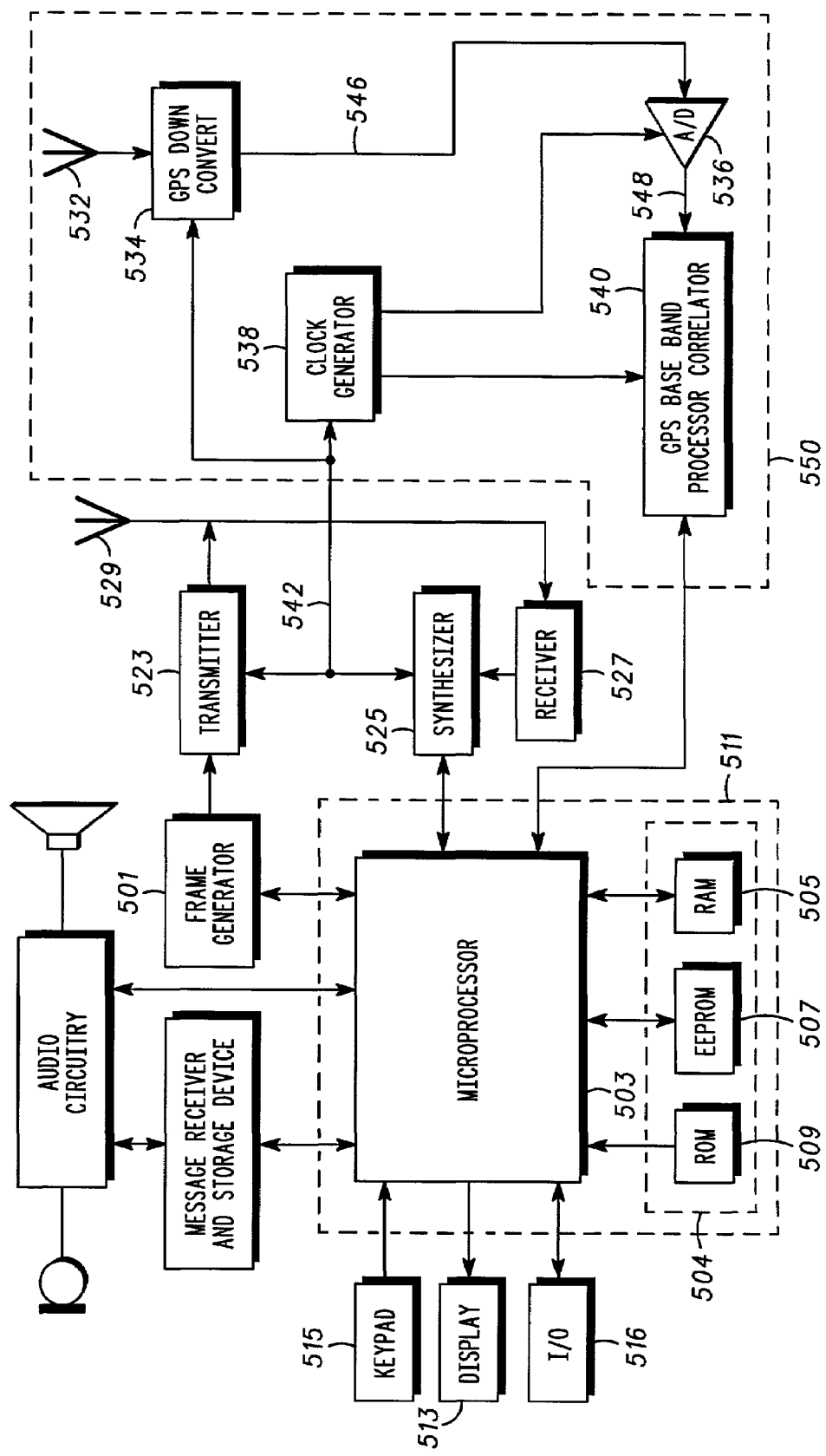
FIG. 8 is a block diagram of a cellular mobile station in accordance with the preferred embodiment of the present invention.

Turning to FIG. 8, a block diagram of a wireless communications device such as an assisted GPS enabled cellular radiotelephone incorporating the present invention is shown. In the preferred embodiment, a frame generator block 501 and a microprocessor 503 combine to generate the necessary communication protocol for operating assisted GPS positioning in a cellular system. Microprocessor 503 uses memory 504 comprising RAM 505, EEPROM 507, and ROM 509, preferably consolidated in one package 511, to execute the steps necessary to generate the transmit protocol and process the receive protocol. In addition, microprocessor 503 performs other functions for the wireless communication device, such as writing to a display 513, accepting information from a keypad 515, accepting input/output information by way of a connector 516, controlling a frequency synthesizer 525, performing the steps necessary to amplify a signal and receive audio output from a microphone and provide audio output to a speaker. In accordance with the preferred embodiment of the present invention, the microprocessor also controls the functions of the GPS circuitry 550 as well as computes the position of the wireless communications device.

A transmitter 523 transmits through an antenna 529 using carrier frequencies produced by the frequency synthesizer 525. Information received by the communication device's antenna 529 enters receiver 527, which demodulates the symbols using the carrier frequencies from the frequency synthesizer 525. The microprocessor 503 may optionally include a digital signal processor means for purposes of processing digital wireless waveforms such as CDMA or TDMA waveforms.

The Global Positioning System receiver 550 integrated into the wireless communications device can be of the conventional autonomous receiver design class or can be of the assisted GPS receiver design class. An example of such an autonomous GPS receiver is that described in U.S. Pat. No. 5,148,452 to Kennedy and King. An example of a GPS receiver of the assisted type is provided in U.S. Pat. No. 5,663,734 to Krasner. The conventional GPS design operates in a more autonomous mode in which all of the positioning data necessary to perform satellite-based location computations is delivered from the GPS satellites directly by way of antenna 532. The assisted GPS receiver design obtains some or all of the necessary satellite location parameters via communications antenna 529 as described in accordance with the present invention in FIGS. 1 to 7.

In accordance with the present invention, the assisted information is developed by a cellular infrastructure network entity and transmitted to the wireless communications device by way of a unique message protocol delivering some or all of the data parameters necessary for rapid location determination as described hereinabove. In addition to speeding the acquisition of location data, the assist information delivered to the wireless communications device can also greatly enhance the detection of the GPS signals in difficult signal blockage environments such as urban canyons and in buildings as described in U.S. Pat. No. 5,663,734.

The elements of an assisted GPS receiver integrated into the wireless communications device consists of a GPS antenna 532 for purposes of receiving the signals transmitted by the GPS satellites. A GPS down converter 534 translates the GPS center frequency of 1575.42 MHz to some lower intermediate or zero-IF frequency 546. The intermediate or zero IF frequency is digitized with an analog to digital converter 536, which makes periodic samples of the intermediate or zero IF frequency signal upon command from a clock generator 538. The output of the analog to digital converter 536 is delivered to a baseband processor correlator 540. The baseband processor correlator 540 performs digital signal processing functions on the signal 548 for purposes of determining the time of arrival of multiple GPS satellite signals arriving simultaneously at antenna 532. The measure of the time of arrival of the GPS signals is encoded in the codephase of each of the particular GPS satellite spreading codes received, as well as the 50 bit per second data modulation overlaid upon the satellite spreading codes.

In a preferred embodiment, the wireless communications device radio frequency generator/synthesizer 525 is used via signal 542 as the basis for the reference frequency for the GPS down converter 534. In many wireless communications devices, the radio reference frequency generator synthesizer 525 is controlled to be synchronized in frequency to the infrastructure base station carrier frequency arriving at antenna 529, which is much more stable in frequency than typical low cost handset reference frequency generators such as a crystal controlled oscillator. By using the infrastructure controlled frequency as the basis of the GPS down converter, the high frequency stability of the infrastructure base station carrier can be used to limit the Doppler frequency search space for the GPS satellite signals.

The synthesizer reference clock signal 542 is also scaled by clock generator 538 to produce the analog to digital converter 536 sample clock signal and optionally, the clock signal to drive the GPS baseband processor correlator 540.

Figure 9A:
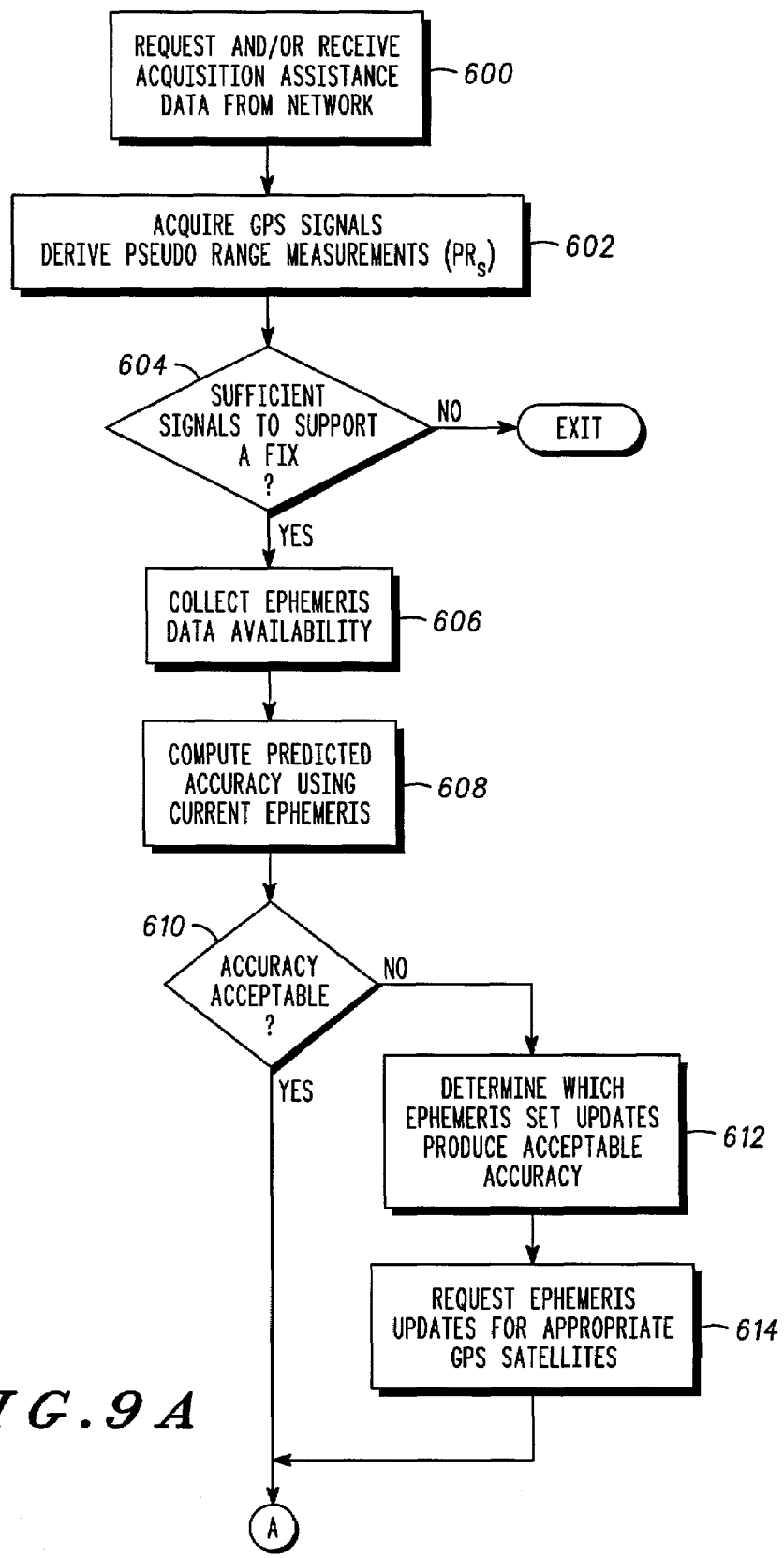
FIGS. 9A and 9B illustrate a flowchart of the operation of the handset of FIG. 8 for request/receive and point-to-point delivery of ephemeris and differential correction data in accordance with the preferred embodiment of the present invention.
Figure 9B:
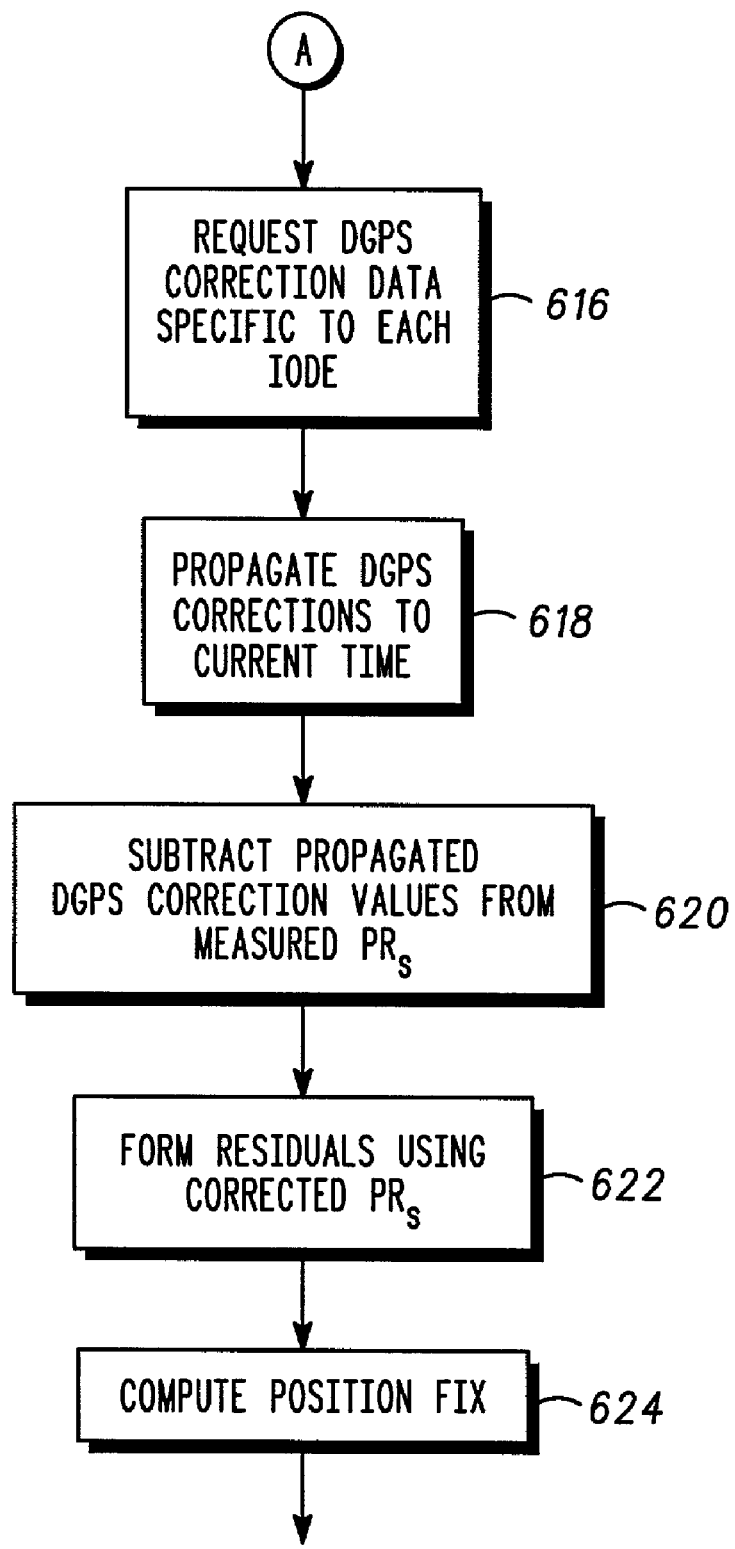
Figure 10A:
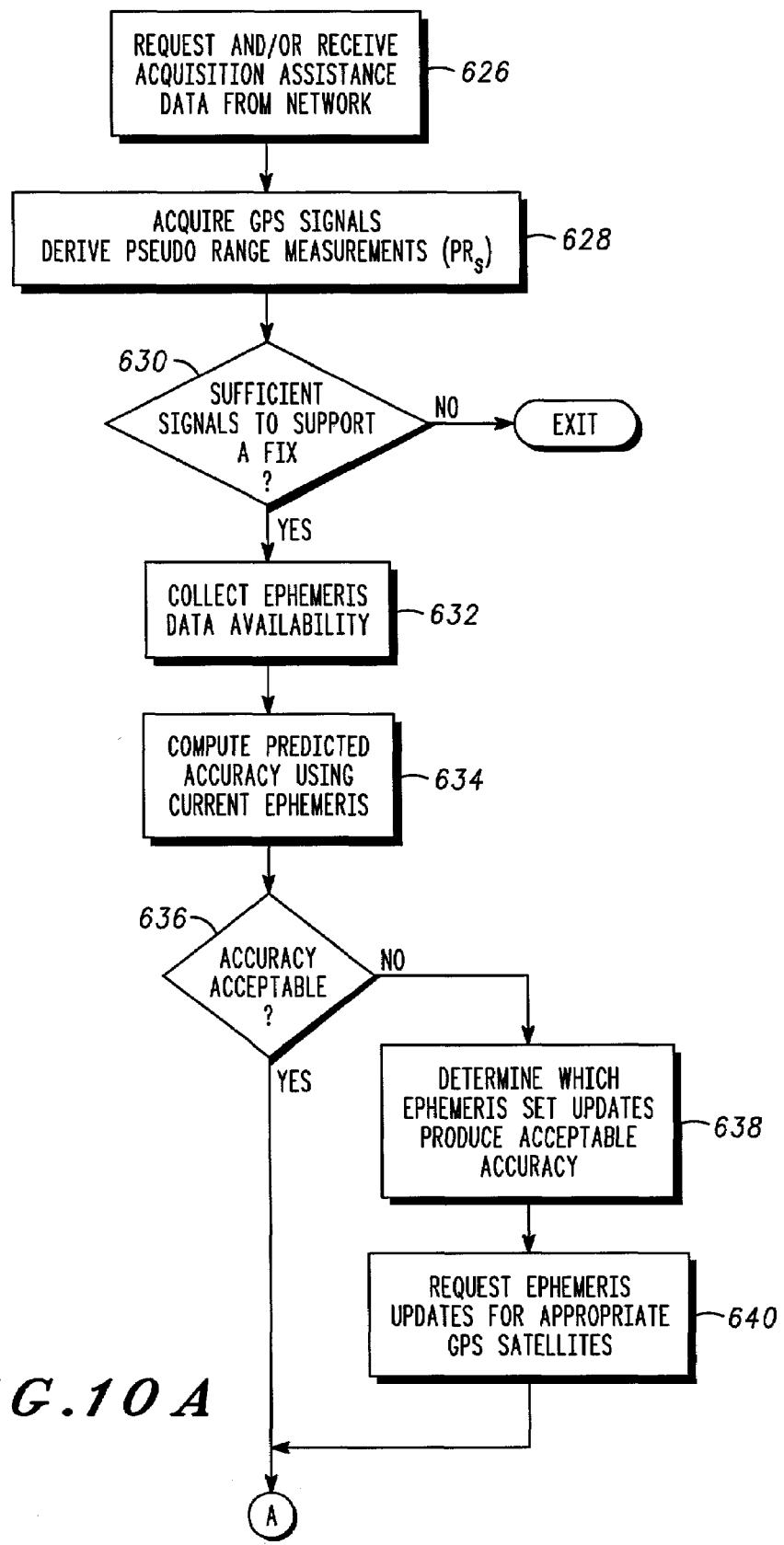
FIGS. 10A and 10B illustrate a flowchart of the operation of the handset of FIG. 8 for request/receive and broadcast delivery of ephemeris and point-to-point delivery of differential correction data in accordance with the preferred embodiment of the present invention.
Figure 10B:
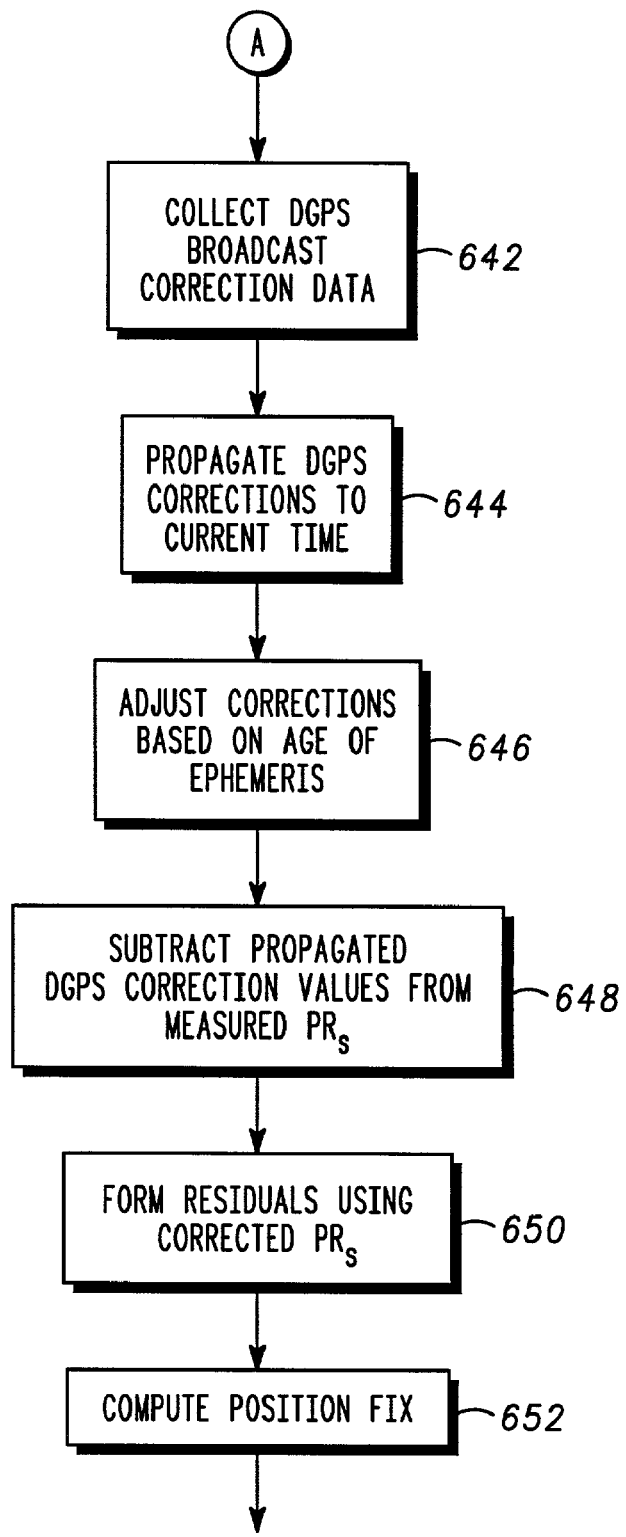

FIGS. 9, 10, 11 and 12 correspond to the sequence of operations and computations which occur in the handset according to the possible protocols of the present invention. In FIG. 9, the combination of a "point-to-point" ephemeris protocol and a "point-to-point" differential protocol is illustrated, while FIG. 10 illustrates a "point-to-point" ephemeris protocol combined with a "broadcast" differential protocol.

Figure 11A:
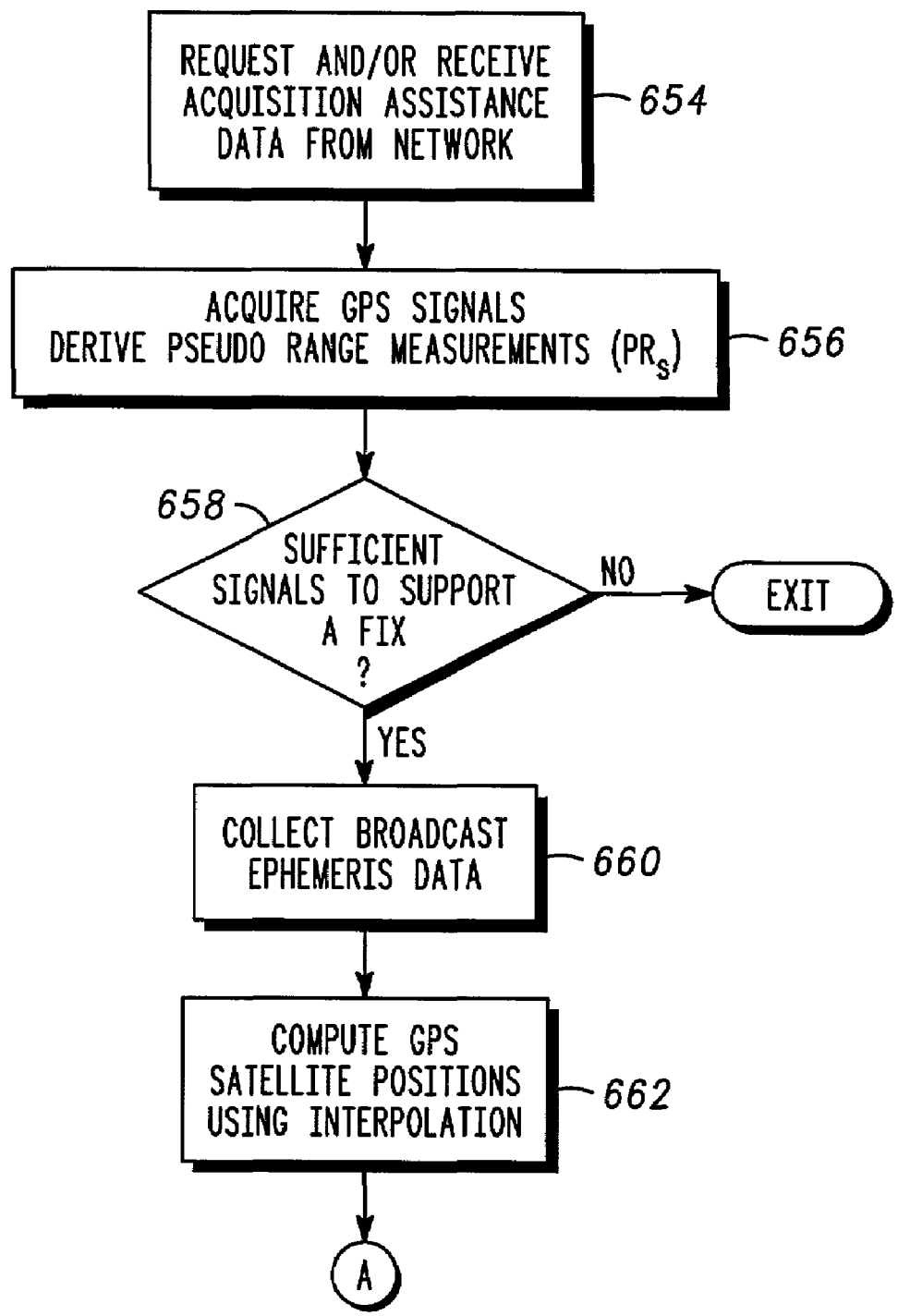
FIGS. 11A and 11B illustrate a flowchart of the operation of the handset of FIG. 8 for request/receive and point-to-point delivery of ephemeris and broadcast delivery of differential correction data in accordance with the preferred embodiment of the present invention.
Figure 11B:
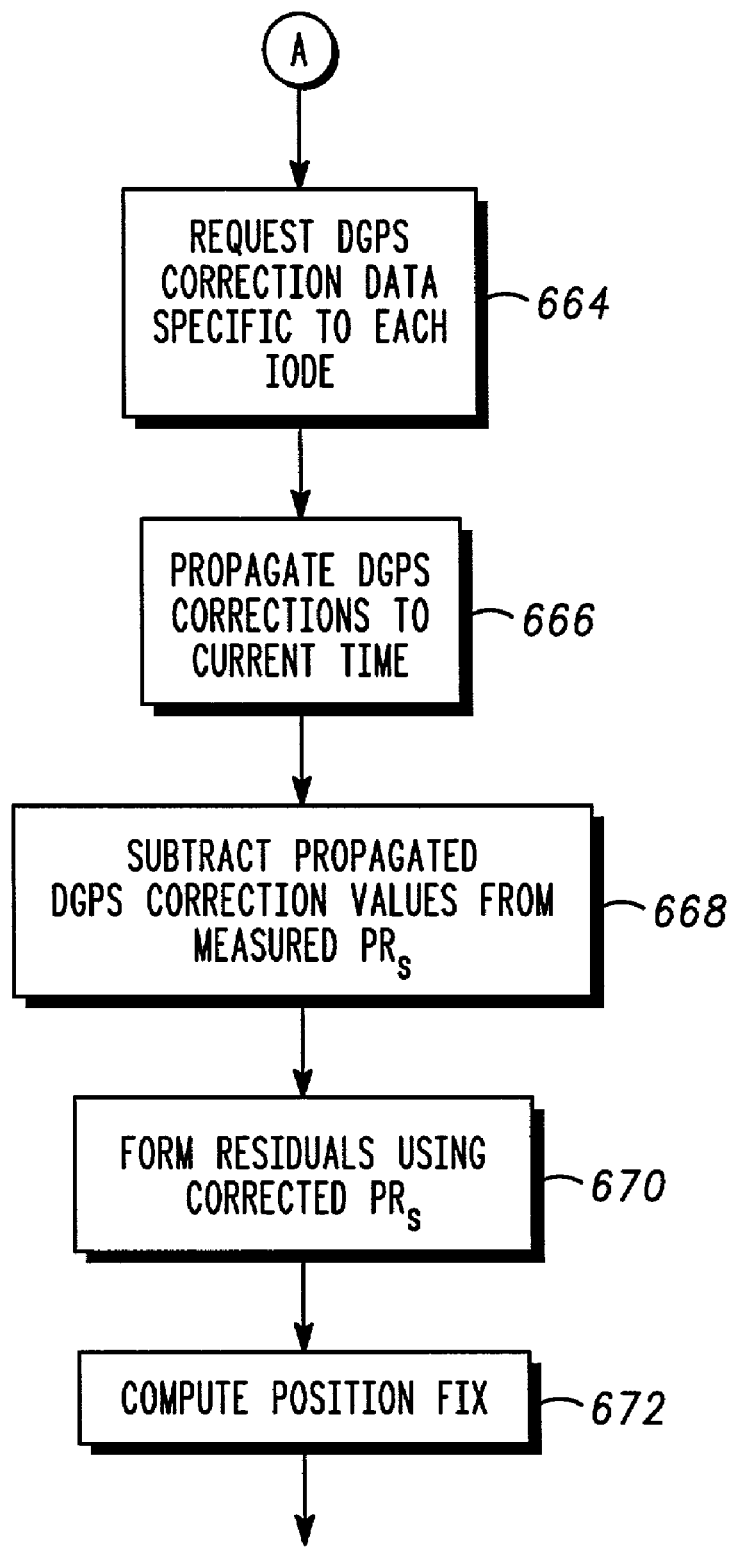
Figure 12A:
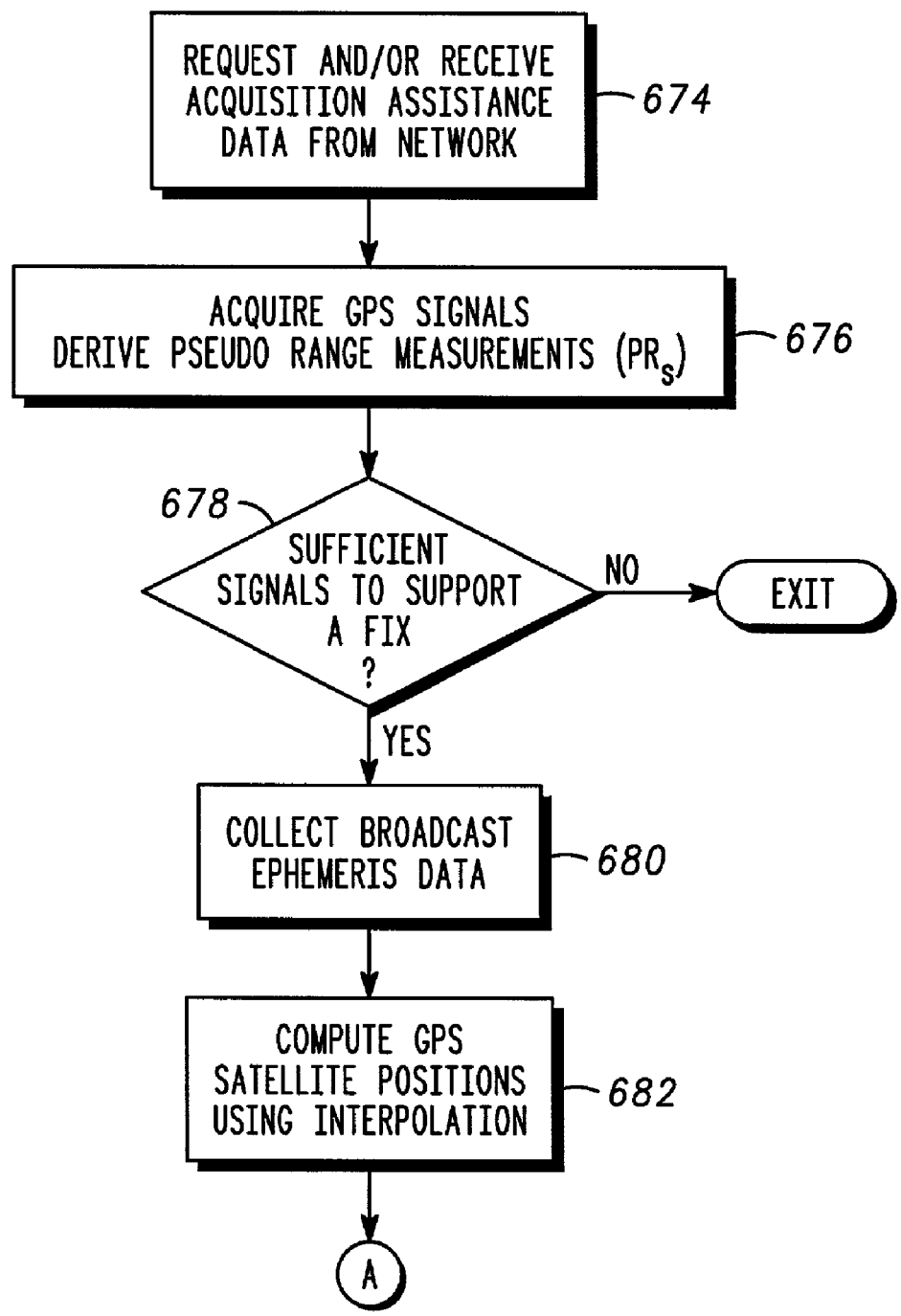
FIGS. 12A and 12B illustrate a flowchart of the operation of the handset of FIG. 8 for request/receive and broadcast delivery of ephemeris and differential correction data in accordance with the preferred embodiment of the present invention.
Figure 12B:
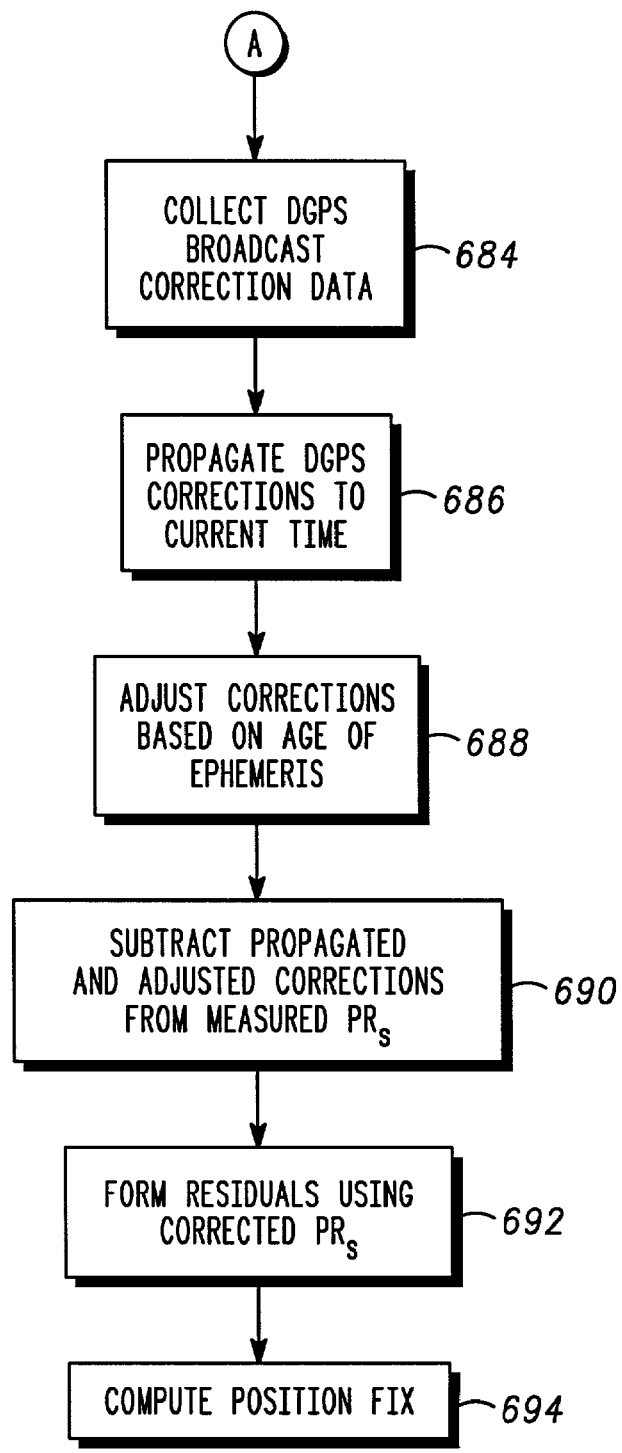

FIG. 11 illustrates the combination of a "broadcast" ephemeris protocol combined with a "point-to-point" differential protocol, and, finally, the combination of a "broadcast" differential protocol with a "broadcast" ephemeris protocol is illustrated in FIG. 12.

In FIG. 9, which represents the first protocol combination of the present invention, the sequence of events within the handset begins with the acquisition of the GPS satellite signals. The GPS signal acquisition process is aided by Assistance Data which is transmitted from the cellular infrastructure in step 600: this data permits narrowing of Doppler and code phase search windows within the GPS receiver acquisition process, and so significantly speeds up the acquisition of the available GPS signals. Note that this step is common across all the protocol combinations. Once the acquisition assistance data is received, Pseudo Range (PR) measurements can be determined for the GPS signals of suitable signal strength in 602. Following this, a test 604 is made to determine if sufficient PRs are available to support a position fix: generally, four satellites are required to compute a fix; however, three satellites may be adequate if an altitude can be assumed or supplied from the infrastructure for the mobile handset. If sufficient satellites are available, the available ephemeris data is collected and examined 606, and the resultant fix accuracy is computed in step 608. If the predicted accuracy is adequate, appropriate "point-to-point" differential correction data can be requested as in 616. If the accuracy is not adequate, however, a determination of which satellites' ephemeris data needs to be upgraded is made in 612, and requests are made for updating ephemeris for only these satellites in 614. The requested DGPS correction data 616 is specific to the IODE for each ephemeris. When the correction data is received, the corrections are first propagated to current time 618, then applied to the measured PRs 620. Residuals are formed between the measured PRs and the predicted range to each satellite (derived using the ephemeris data and a prior position estimate) 622, and used to refine the position estimate, or compute a position fix 624. In using this protocol combination, control of the transfer of data for each handsets position computations resides within the handset itself. Such a protocol will therefore minimize data transactions within the cellular network, as each transfer is driven by a mobile handset's need.

In FIG. 10, which represents the second protocol combination of the present invention, the sequence of events within the handset begins with the acquisition of the GPS satellite signals. The GPS signal acquisition process is aided by Assistance Data which is transmitted from the cellular infrastructure in 628: this data permits narrowing of Doppler and code phase search windows within the receiver acquisition process, and so significantly speeds up the acquisition of the available GPS signals. Once the acquisition assistance data is received. Pseudo Range (PR) measurements can be derived to GPS signals of suitable signal strength in 630. Following this, a test 630 is made to determine if sufficient PRs are available to support a position fix: generally, four satellites are required to compute a fix; however, three satellites may be adequate if an altitude can be assumed or supplied from a terrain data base for the mobile handset. If sufficient satellites are available, the available ephemeris data is collected and examined 632, and the resultant fix accuracy is computed in step 634. If the predicted accuracy is adequate, appropriate differential correction data can be collected in step 642. If the accuracy is not adequate, however, a determination of which satellites' ephemeris data needs to be upgraded is made in 638, and requests are made for updated ephemeris for only these satellites in 640. In step 642, the DGPS broadcast data is collected, and then propagated to the current time in 644. In 646, the corrections must be adjusted, based on the ephemeris ages; note that the broadcast message includes corrections for all (or partial) possible Issue of Data Ephemeris (IODE) values. The propagated and adjusted corrections are then applied to the measured PRs 648. Residuals are formed between the measured PRs and the predicted range to each satellite (derived using the ephemeris data and a prior position estimate) 650, and used to refine the position estimate, or compute a position fix 652. In using this protocol combination, control of the transfer of ephemeris data for each handsets position computations resides within the handset itself. Such a protocol will therefore minimize the data transactions associated with ephemeris distribution within the cellular network, as each transfer is driven by a mobile handset's need. However, use of a DGPS "broadcast" mode may increase the traffic flow for DGPS data distribution relative to the first protocol combination described in FIG. 9. This increase comes with a simplification in the logic within the infrastructure for determining when to distribute the DGPS corrections, since they will simply be broadcast at a fixed rate (e.g., typically every 30 seconds when SA is on and a longer period when SA is off).

In FIG. 11, which represents the third protocol combination of the present invention, the sequence of events within the handset begins with the acquisition of the GPS satellite signals. The GPS signal acquisition process is aided by Assistance Data which is broadcast from the cellular infrastructure in 654: this data permits narrowing of Doppler and code phase search windows within the receiver acquisition process, and so significantly speeds up the acquisition of the available GPS signals. Once the acquisition assistance data is received, Pseudo Range (PR) measurements can be derived to GPS signals of suitable signal strength in 656. Following this, a test 658 is made to determine if sufficient PRs are available to support a position fix: generally, four satellites are required to compute a fix; however, three satellites may be adequate if an altitude can be assumed or supplied from a terrain data base for the mobile handset. If sufficient satellites are available, the available ephemeris data is collected and examined in step 660. The most recent broadcast ephemeris data is collected, and then used to compute satellite positions using interpolation in 662. The requested "point-to-point" DGPS correction data 664 is specific to the IODE for each ephemeris. When the correction data is received, the corrections are first propagated to current time 666, then applied to the measured PRs 668. Residuals are formed between the measured PRs and the predicted range to each satellite (derived using the ephemeris data and a prior position estimate) 670, and used to refine the position estimate, or compute a position fix 672. In using this protocol combination, control of the transfer of DGPS data for each handsets position computations resides within the handset itself. Such a protocol will therefore minimize data transactions within the cellular network, as each transfer is driven by a mobile handset's need. However, use of an ephemeris "broadcast" mode may increase the traffic flow for ephemeris data distribution relative to the first combination described in FIG. 9. This increase comes with a simplification in the logic within the infrastructure for determining when to distribute the ephemeris data, since it will simply be broadcast at a fixed rate (e.g., typically every 30 minutes).

In FIG. 12, which represents the fourth protocol combination of the present invention, the sequence of events within the handset begins with the acquisition of the GPS satellite signals. The GPS signal acquisition process is aided by Assistance Data which is broadcast from the cellular infrastructure in 674: this data permits narrowing of Doppler and code phase search windows within the receiver acquisition process, and so significantly speeds up the acquisition of the available GPS signals. Once the acquisition assistance data is received, Pseudo Range (PR) measurements can be derived to GPS signals of suitable signal strength in 676. Following this, a test 678 is made to determine if sufficient PRs are available to support a position fix: generally, four satellites are required to compute a fix; however, three satellites may be adequate if an altitude can be assumed or supplied from a terrain data base for the mobile handset. If sufficient satellites are available, the available ephemeris data is collected and examined in step 680. The most recent broadcast ephemeris data is collected, and then used to compute satellite positions using interpolation in 682. In step 684, the DGPS broadcast data is collected, and then propagated to the current time in 686. In 688, the corrections must be adjusted, based on the ephemeris ages; note that the broadcast message includes corrections for all (or partial) possible IODE values. The propagated and adjusted corrections are then applied to the measured PRs 690. Residuals are formed between the measured PRs and the predicted range to each satellite (derived using the ephemeris data and a prior position estimate) 692, and used to refine the position estimate, or compute a position fix 694. In using this protocol combination, control of the transfer of ephemeris and DGPS correction data for each handsets position computations resides within the network. Such a protocol will therefore minimize the logic associated with the data distribution from the network, at the expense of additional network traffic when compared to "point-to-point" strategies. Ephemeris and DGPS correction will be broadcast at a fixed rate (e.g., typically every 30 minutes for ephemeris data and every 30 seconds for DGPS correction data when SA is on and a longer period when SA is off).

In regards to a GPS integrity monitor, the DGPS correction data is used to compensate the pseudoranges derived by a DGPS reference receiver at a surveyed site and compute a DGPS position fix: the fix error relative to the known position of the receiver which can be used to measure the effectiveness of the differential corrections. For example, if the fix error is consistent with its predicted accuracy (e.g., as predicted using the UDRE values and the covariance matrix elements of the Weighted Least Squares (WLS) solution), then the DGPS corrections have not been contaminated by excessive multipath and/or noise. On the other hand, should the computed error be large relative to expectations, some means of informing mobile users of the accuracy degradation should be initiated. For mobile phase location applications, installing separate GPS receivers for the purpose of GPS integrity monitoring can be expensive and time consuming.

Referring next to FIG. 13, since the reference GPS receiver (with differential capabilities) and its server are already available for A-GPS, the network itself can perform the integrity monitoring function. By requesting the filtered pseudorange data 726 and computed satellite positions 704 and clock corrections (in addition to the pseudorange corrections) 724 from the GPS reference receiver 700 connected with an antenna 728, the network (or SMLC 706) can compute the location of the reference GPS receiver, and compare this with its surveyed location. In this way, the network can serve as its own integrity monitor 702, and inform GPS users of potential accuracy degradations. The integrity monitoring function should inform users of failed satellites in 710. Well-established techniques exist for determining when a single satellite's clock may be drifting at an abnormally high rate and can be applied here. For DGPS users, the UDRE parameters which are output from the GPS reference receiver 700 be appropriately adjusted 708 to inform users of the degradation. If there is no allowance made in the DGPS messaging structure for declaring an individual satellite unhealthy, the corrections will simply be excluded from the message for the failed satellite, as in 714. For non-DGPS users, such as MS assisted, MS based, and occasionally autonomous, which request assistance data 712, a specific part of the assistance data 712 can be excluded for failed or failing satellites. Similarly, for MS assisted GPS users, since the MS position is determined at the server 722, a specific failed or failing satellites parameters such as pseudoranges returned from the MS can be excluded from the final calculation in 718. Non-DGPS users not requesting the assistance data, such as autonomous users, will be required to request integrity information, in the form of a use/don't use indicator for all visible satellites 716. The integrity information is therefore sent via the link 720, which is connected to the communications network, to all mobile handsets utilizing GPS to compute a position. As one skilled in the art would recognize, the GPS reference receiver 700 and its server 722 (or position determination entity) could be located at any surveyed location with an open view of the sky so long as it can be linked to the network or co-located with another network node. As discussed before, the GPS server 722 could also be an integral part of a network node such as the SMLC 706 or an integral part of the Reference GPS Receiver 700, or an independent entity. As previously stated, the assistance data include all of these that can be used for A-GPS, such as GPS time, Doppler, and Code Search Window for MS assisted GPS, GPS time, ephemeris and clock correction for MS based GPS, and UTC time, ionosphere, Almanac, and other items built from GPS satellite signals. The invention defines six point-to-point messages and two broadcast messages: Point-to-point messages—request ephemeris/clock correction update (handset to network), ephemeris/clock correction update (network to handset), request point-to-point DGPS correction (handset to network), point-to-point DGPS correction (network to handset), request point-to-point integrity data (handset to network), and point-to-point integrity data (network to handset); and Broadcast messages—DGPS Broadcast message (network to many handsets) and ephemeris broadcast message (network to many handsets). Optionally, as one skilled in the art would recognize, these and other assistance messages could be pushed from the network without MS' request (or solicitation). Each message exchange is discussed further, with detailed parameter descriptions.

Request Ephemeris/Clock Correction Update (Handset to Network)

The point-to-point ephemeris control messages permit a minimal control and transmission of raw ephemeris and clock correction data to the mobile. In this mode, the handset needs only request ephemeris data one time per satellite pass. In this protocol, the MS informs the network which satellite ephemeris sets it contains in memory by presenting a list of SatID's and the satellite's corresponding IODE (Issue Of Data Ephemeris). In addition, the handset sends an ephemeris age limit $(t-t_{oc})$ that tells the network to send raw ephemeris for all presently visible satellites for which the handset ephemeris is now older than the ephemeris age limit specified. Finally, an ephemeris age override bit informs the network to ignore the ephemeris age limit and to deliver the raw ephemeris without regard to its age. This override bit could be represented by an unused number in $(t-t_{oc})$, such as the maximum number.

Given the set of IODEs from the MS corresponding to the raw ephemeris stored in handset memory, and a recognition of the minimum spatial decorrelation associated with the ephemeris error component of the differential corrections, only a single raw ephemeris is generally required for each pass of a satellite. However, it is recognized that the accuracy requirements for different classes of users will vary. Therefore, an algorithm is defined which each handset can mechanize to predict the effects of ephemeris age upon the resultant solution accuracy. This algorithm further reduces the data transmission requirements, since it will request a new ephemeris if, and only if, it is dictated by the mobile's accuracy requirements.

Because the invention requires that differential corrections be derived for each IODE, a new broadcast message is defined. This broadcast message makes use of an intelligent compression of the differential correction data such that only a single message is typically required for all the available IODEs. A description of the ephemeris broadcast message appears later.

Ephemeris/Clock Correction Update (Network to Handset)

As described above, the ephemeris data is transmitted only when the MS makes a request or when the infrastructure notices that the handset ephemeris is older than that allowed by the MS designated threshold for ephemeris age. The content of this message is given in Table 1 below:

TABLE 1

Ephemeris/Clock Correction; Update Message Content

| Parameter | Description | Units |
|---|---|---|
| N_Sat | Number of satellites for which the rest appears | |
| SatID | Satellite ID | |
| SatHealth | Health and Status | |
| URA | User Range Accuracy | |
| $T_{GD}$ | Correction for group delay | secs |
| IODE | Ephemeris issue for which the corrections apply | |
| $t_{oc}$ | Time of applicability of clock corrections | secs |
| $a_{f0}$ | Zero order clock correction | secs |
| $a_{f1}$ | First order clock correction coefficient | secs/sec |
| $a_{f2}$ | Second order clock correction coefficient | secs/sec$^2$ |
| $C_{rs}$ | Radial correction coefficient | meters |
| $\Delta n$ | Correction to mean motion | semi-circles/sec |
| $M_0$ | Mean anomaly | semi-circles |
| $C_{uc}$ | Argument of latitude correction coefficient | radians |
| e | Eccentricity | |
| $C_{us}$ | Argument of latitude correction coefficient | radians |
| $(A)^{1/2}$ | Square root of semi-major axis | meters$^{1/2}$ |
| $t_{oe}$ | Time of applicability of ephemeris | secs |
| $C_{ic}$ | Inclination correction coefficient | radians |
| $\Omega_0$ | Nominal longitude of ascending node | semi-circles |
| $C_{is}$ | Inclination correction coefficient | radians |
| $i_0$ | Nominal inclination | semi-circles |

TABLE 1-continued

Ephemeris/Clock Correction; Update Message Content

| Parameter | Description | Units |
|---|---|---|
| $C_{rc}$ | Radial correction coefficient | meters |
| ω | Argument of perigee | semi-circles |
| Ωdot | Rate of change of right ascension | semi-circles/sec |
| idot | Rate of change of inclination | semi-circles/sec |

The first parameter, N_Sat, is sent once per message while the rest of the parameters are transmitted for each satellite included in N_Sat. The parameters (excluding N_Sat) which appear in Table 1 correspond to the conventional set of ephemeris and clock correction data with the addition of the URA, $T_{GD}$, and IODE parameters. Inclusion of the URA parameter will permit the MS to adjust its accuracy predictions as a function of the level of Selective Availability (SA). In addition, the ephemeris requests can be made on the basis of the accuracy prediction done by each mobile. Inclusion of $T_{GD}$ will permit each mobile to correct for group delay affects, and derive the most accurate solution possible. Also, inclusion of the IODE parameter will allow the MS to determine if the IODE matches. In the case of an IODE mismatch, the MS can deweight the information from the satellite with the IODE mismatch to correct for offset effects. As stated above the IODE value can be used to determine how to compress each parameter of the ephemeris and clock correction data.

Request Point-to-Point DGPS Correction (Handset to Network)

The point-to-point DGPS correction message is requested by the mobile when differential accuracies are required to meet the position performance requirements of the handset based application (example, emergency location). In this protocol, the MS informs the network which satellite ephemeris sets it contains in memory by presenting a list of SatID's and the satellite's corresponding IODE (Issue Of Data Ephemeris). The network can then tailor the DGPS Correction according to the specific IODE the handset has. In this mode, the handset needs only request ephemeris data one time per satellite pass. The differential corrections delivered to the handset in a point-to-point mode are customized by the network so that the additional error effect due to the ephemeris age in the handset are absorbed and compensated by the differential correction. In this way, a simple differential correction response message as shown in Table 2, below, is used. It is expected that point-to-point differential corrections will be the preferred and mostly used configuration until broadcast differential channels become ubiquitous in GSM networks (not all GSM networks implement broadcast services). In accordance with the preferred embodiment of the present invention, the protocol is optimized for this most likely mode by minimizing the total message traffic since the raw ephemeris is only sent one time per satellite pass and the differential correction is tailored to the specific ephemeris stored by the mobile. Additional benefits of this message are that the end-application can control the location accuracy and the cellular operator can make profit out of the application or the user who has chosen the service of this particular message.

Point-to-Point DGPS Correction Message (Network to Handset)

The content of this message appears in Table 2. Note that the differential corrections are sent for only the particular IODE for which they are requested. Corrections could also been sent for multiple IODEs if so desired. In accordance with the preferred embodiment of the present invention, the errors associated with differential correction latency are kept to acceptable levels by advantageously sending the DGPS corrections every 30 seconds or at a rate requested by the mobile.

TABLE 2

Point-to-Point DGPS Correction; Message Content (per satellite)

| Parameter | Description | Parameters Sent |
|---|---|---|
| N_Sat | Number of satellites for which corrections appear | Once per message |
| Time | GPS time at which the correction data is valid, secs | Once per message |
| SatHealth | Health and Status, including UDRE SF | Once per message |
| SatID | GPS satellite for which corrections apply | N_Sat times |
| Corr SF | Scale factor for the correction data | N_Sat times |
| IODE | Ephemeris issue for which the corrections apply | N_Sat times |
| UDRE | User Differential Range Error (accuracy predictor, meters) | N_Sat times |
| PRC | Pseudo range correction, meters | N_Sat times |
| RRC | Range rate correction, meters/sec | N_Sat times |

The present invention reduces network traffic by allowing the differential corrections to compensate for errors induced by aging ephemeris data. In order to accomplish this goal for point-to-point transmission, correction message in Table 2 should be tailored (or applied) based on the current IODE value of the serving MS or receiver. As described in Request Point-to-Point DGPS Correction, the current IODE values of the MS can be transmitted to or the network (or SMLC 706) as a part of MS originated message. Depending on the particular application, certain parameters can be optional, such as Corr SF and IODE. Another alternative is to transmit the corrections for all available IODE values as described in Table 3. To save the bandwidth, PRC and PPC values can be compressed with bits less than required RTCM Standard values while maintaining enough resolutions or accuracy for LCS as described in DGPS Broadcast Message.

Request Point-to-Point Integrity Data (Handset to Network)

An autonomous GPS user which does not request and make use of GPS signal acquisition assistance data must request integrity data from the network to avoid using failed or failing GPS satellites in its position determination.

Point-to-Point Integrity Data (Network to Handset)

This message is sent by the network in response to the request by a mobile handset utilizing GPS in an autonomous mode. The network responds simply with a single use/don't use bit for each satellite which is tracked by the mobile handset. The integrity bit is set from the magnitude of the DGPS correction, as indicated in Equation (5) later.

The IM derives two types of integrity information for transmission to mobile GPS users in this message: measurement quality information, embedded in the transmitted UDRE values for DGPS users, and GPS satellite failure information. The first step performed by the integrity monitoring function is to request that the filtered pseudorange data, in addition to the computed satellite positions, are output to the SMLC (or whatever node is connected to the reference GPS receiver and used for IM) which implements the integrity monitoring function. Satellite clock corrections are also required, unless the pseudoranges output by the GPS reference receiver have already been corrected: this is a design detail which may need to be worked out with the reference receiver supplier. A 1 Hz output rate is preferred for IM; however, lower rates are acceptable. As the pseudorange (and pseudorange rate) corrections are received, they are saved up to the maximum anticipated mobile propagation interval (e.g., 30 seconds under present SA levels). This enables assessment of the errors induced by propagation of the corrections by the integrity monitor. If prior correction data is available, the pseudorange and rate corrections (i.e., the PRC and RRC values) are propagated to the current time using the PRC and RRC correction rates without retrieving the current PRC and RRC values: selection of an appropriate propagation interval is not trivial. Use of an assumed 30 second propagation interval represents a worst-case, but will not adequately characterize the mobile positioning error induced by propagation in general. The propagation interval utilized by each mobile can be characterized as a random variable which is uniformly distributed between 0 and 30 seconds. Use of its mean value (15 seconds) may therefore be more appropriate: the level of conservatism which is desired in the integrity monitor will drive the selection. Note that this propagation will cause the effect of a failing satellite (with potentially adverse temporal decorrelation) to be flagged by the integrity monitor until the failed satellite is removed from the solution set.

Once propagated to the time of the current pseudorange, the correction values are subtracted from the pseudoranges; satellite clock (including relativistic) corrections may also be subtracted if the GPS reference receiver has not already performed this compensation. Using the computed satellite positions (assumed available in an Earth Centered Earth Fixed (ECEF) frame), and the surveyed location of the reference receiver, unit Line Of Sight (LOS) vectors are computed to each satellite: these calculations can be performed in either an ECEF or local level (e.g., East North Up (ENU)) frame. The unit LOS vectors are then collected together into the measurement gradient matrix, H. Each row of H corresponds to the LOS vector to a satellite:

$$h_i^T = [u_i^T 1] \quad (1)$$

Bold symbols denote vectors, the index i in Equation 1) refers to the satellite (or row of H); u is the unit LOS vector to the ith satellite, and T denotes the transpose operation.

Next, residuals are found between each differentially corrected (and propagated) pseudorange and an estimated range to each satellite (using the output satellite position and the surveyed location of the reference receiver):

$$PR_{res} = PR_{meas} - R_{est} \quad (2)$$

A measurement error covariance matrix, R, is next constructed using the UDRE values output by the DGPS reference receiver, and an error variance which is representative of the error induced by the correction propagation:

$$R_{ii} = UDRE_i^2 + \sigma_{SAacc}^2 \Delta t_{prop}^2/2 \quad (3)$$

In equation 3), $\sigma_{SAacc}$ is the one-sigma error associated with SA acceleration, and $\Delta t_{prop}$ is the propagation interval assumed for the corrections by the integrity monitor. Note that R is a diagonal matrix, so is easily inverted. The solution correction vector is found next:

$$\Delta x = PH^T R^{-1} PR_{res} \quad (4)$$

where $P = (H^T R^{-1} H)^{-1}$.

Since the starting point for the WLS solution above was the surveyed location, the magnitude of the correction vector $\Delta x$ represents the solution error. The matrix P above is the solution error covariance, whose diagonal elements represent the expected position error variances. A normalized error statistic can be computed, as in Equation 5) below:

$$S = \Delta x^T P \Delta x \quad (5)$$

The statistic S represents the magnitude of the solution error (squared) relative to its expected error variance. It is this statistic which is proposed as a monitor of the solution accuracy. Of course, many other statistics could similarly be used, including statistics derived from S (e.g., its sample mean derived from multiple solutions).

A threshold T needs to be established for S based on the level of conservatism desired for the integrity monitor: e.g., a value of 4 corresponds to a "two-sigma" error condition. When S exceeds this threshold, the each UDRE value will be increased (uniformly across all satellites), which reduces the magnitude of S (if recomputed). Pseudo-code for making the necessary adjustment is provided below:

If (S>T), *UDRE_new=SQRT(S/T)\*UDRE_old*

The adjusted value for the UDRE above is then used to generate the value used for the UDRE in the appropriate message, as defined in Table 2 for point-to-point, and Table 3 for broadcast. Note the differences which exist for point-to-point (in Table 2) and broadcast (in Table 3) correction values: for point-to-point, only those UDRE values corresponding to satellites which are actually in use are adjusted; for broadcast corrections, all UDRE values must be adjusted, since it is not known what subset of the corrections a mobile handset may use.

In addition to the UDRE scale factor adjustment above, satellite clock failures must be detected and isolated. The mathematics for detecting and isolating satellite failures is described in Geier and King, Predicting the Accuracy and Integrity of GPS Timing", IEEE FCS, 1994. However, this development does not make use of the DGPS correction data, which enables simplification of the calculations. A simpler test can be constructed based upon the magnitude of each computed DGPS correction value for each satellite i:

If (fabs($PRC_i$)>N*$\sigma_{PR}$), Set satellite i unhealthy.

The parameter N controls the conservation of the test. A value of 5 or 6 should make false alarms which is extremely rare. Based upon nominal levels of SA, the one-sigma level associated with pseudorange error should be (conservatively) to 35 meters. Off-nominal levels of the URA parameter (its nominal level is 7) should cause corresponding changes in $\sigma_{PR}$ (i.e., both larger and smaller). Thus, the test will become more effective when SA is deactivated.

DGPS Broadcast Message (Network to Many Handsets)

As stated hereinabove, the present invention reduces network traffic by allowing the differential corrections to compensate for errors induced by aging ephemeris data. In order to accomplish this goal for broadcast transmission, the corresponding broadcast DGPS message must include correction sets for all available IODE values. This could lead to a message length which exceeds the 82 octet maximum message length for GSM Short Message Service Cell Broadcast (SMSCB) messages. However, as shown in Table 3 below, the data is intelligently compressed in accordance with the preferred embodiment of the present invention.

TABLE 3

DGPS Broadcast Message Content

| Parameter | Description | Parameters Sent |
|---|---|---|
| N_Sat | Number of satellites for which corrections appear | Once per message |
| Time | GPS time at which the correction data is valid, secs | Once per message |
| SatHealth | Health and Status, including UDRE SF | Once per message |
| Δ_Count | Flag for ΔPRC and ΔRRC linked to the current and less current IODEs | Once per message |
| SatID | GPS satellite for which corrections apply | N_Sat times |
| Corr SF | Scale factor for the correction data | N_Sat times |
| Current IODE | Current ephemeris issue for which the corrections apply | N_Sat times |
| UDRE | User Differential Range Error (accuracy predictor, meters) | N_Sat times |
| PRC-PRC$_{avg}$ (or PRC) | Compressed pseudo range correction, meters | N_Sat times |
| RRC-RRC$_{avg}$ (or RRC) | Compressed range rate correction, meters/sec | N_Sat times |
| N_IODE | Number of previous IODE correction values | N_Sat times |
| ΔPRC | Difference in PRC values, meters | N_IODE times |
| ΔRRC | Difference in RRC values, meters/sec | N_IODE times |

Several aspects of the intelligent compression used in the broadcast message are evident from Table 3, while others are more subtle. As discussed, the same compression can be used for point-to-point DGPS parameters of Table 2. The DGPS time tag is compressed relative to the full twenty bits of the RTCM standard for DGPS correction data due to each mobile having reasonably reliable timing information. The differential correction data itself is compressed either by simply reducing the bits defined in RTCM while maintaining the required LCS accuracy or by subtracting the average value of the corrections across all satellites from each PRC and RRC value. This average value reflects the common time and frequency biases in the correction data which are induced by the oscillator offset and drift. These biases have no effect on the navigation solution of the differentially corrected mobile and so can be removed. Alternatively, if the DGPS reference receiver has already removed the average of the correction values, or the drift of the DGPS reference receiver's clock is known to be insignificant relative to the correction values, then this operation is not required. In addition, it is usually not necessary to include ΔRRC values for the previous IODE's, since the velocity errors induced by ephemeris age are small relative to the nominal latency errors. However, in certain applications, where velocity accuracy is important, it can be advantageous to include them. In addition, when SA is de-activated by the Department of Defense, the errors induced by neglect of the ΔRRC values will become more significant, relatively speaking. Therefore, ΔRRC could be optional. Similarly to the point-to-point DGPS message in Table 2, depending on the particular application, certain parameters can be optional too, such as Corr SF. The parameter N_IODE in Table 3 determines the number of previous IODE values which are included: this number will range from 1–4, depending upon the bandwidth reduction required (a value of 4 corresponds to the maximum infrastructure bandwidth reduction). Additionally, if fewer than 4 is utilized for this parameter, the ΔPRC (and perhaps ΔRRC) values need not be continuous: i.e., it may be advantageous to skip the ΔPRC (and perhaps ΔRRC) values for the ephemeris copy closest to the current ephemeris, since it produces the smallest differences. For example, one can transmit the corrections of the current IODE with the one prior to the one older than the current IODE. Finally, because the ΔPRC difference values are driven by ephemeris age error and not by normal DGPS latency effects (e.g., SA acceleration), they do not have to be sent as frequently as every short period, such as thirty seconds. A longer broadcast period will aid in data compression. In the worst case, sending the ΔPRC difference values once a longer period, such as per minute, or even longer when SA is off, will suffice. One option is to use Δ_Count to indicate this alternating scheme. The worst case occurs when the ephemeris is oldest, which suggests an additional compression of the data based inversely on age: i.e., the more recent PRC difference values will be sent less frequently. Using these two compression techniques, the number of bytes needed to transport the DGPS broadcast message to all visible satellites is less than eighty-two bytes. Of course, if the message length is less a concern, the compression techniques described above become optional. Despite this obvious fact, the principle of applying DGPS corrections based on the current and previous IODEs is still valid for transmission bandwidth savings, i.e., by reducing or eliminating the frequent update of the ephemeris and clock correction data.

Ephemeris Broadcast Message (Network to Many Handsets)

The contents of the broadcast ephemeris message are given in Table 4. Note that the message is comprised of two sets of computed positions and velocities for each GPS satellite, which reduces the number of bits required to be broadcast relative to sending full sets of ephemeris data. These two sets of data are separated in time, to permit mobile handsets to interpolate between the times of applicability of the computed data to derive position and velocity data at the current time. The use of interpolation, rather than extrapolation, removes any significant error relative to a handset computation based upon a full set of ephemeris data.

TABLE 4

Broadcast Ephemeris Message

| Parameter | Description |
|---|---|
| $t_0$ | time of applicability of first set of positions and velocities, secs |
| Δt | time interval between sets, mins |
| N_Sat | number of GPS satellites for which position and velocity data follow |
| SatID | ID for this set of positions and velocities |
| $X_0$ | ECEF X position component at time t, meters |
| $Y_0$ | ECEF Y position component at time t, meters |
| $Z_0$ | ECEF Z position component at time t, meters |
| $X\_dot_0$ | ECEF X velocity component at time t, meters/sec |
| $Y\_dot_0$ | ECEF Y velocity component at time t, meters/sec |
| $Z\_dot_0$ | ECEF Z velocity component at time t, meters/sec |
| $X_1$ | ECEF X position component at time t + Δt, meters |
| $Y_1$ | ECEF Y position component at time t + Δt, meters |
| $Z_1$ | ECEF Z position component at time t + Δt, meters |
| $X\_dot_1$ | ECEF X velocity component at time t + Δt, meters/sec |

TABLE 4-continued

Broadcast Ephemeris Message

| Parameter | Description |
|---|---|
| Y_dot$_1$ | ECEF Y velocity component at time t + Δt, meters/sec |
| Z_dot$_1$ | ECEF Z velocity component at time t + Δt, meters/sec |

To further reduce the number and length of the broadcast ephemeris messages, the present invention would encompass an ephemeris broadcast message that sends only one satellite position and velocity vector per message. This would require the mobile station to obtain two successive ephemeris broadcast messages at $t_1$ and $t_2$ before being able to compute the position of the mobile station at some other time between $t_1$ and $t_2$.

In accordance with another aspect of the present invention, an algorithm is used by the handset to compute satellite position and velocity at an arbitrary time $t_0 < t < t_1$ (where $t_1 = t_0 + \Delta t$). The algorithm is iterative in nature, taking two steps which are comprised of first computing an initial acceleration estimate from the velocity data, then using this, together with the position data, to compute a jerk (the derivative of acceleration), which is then used to refine the position estimates. The algorithm is identical for each component of position and velocity, so only a single component is detailed in the equations below. An acceleration estimate is found using Equation (6):

$$X\_ddot = (X\_dot_1 - X\_dot_0)/(t_1 - t_0) \qquad (6)$$

The acceleration estimate from Equation (6) is used to predict $X_1$ using Equation (7) below:

$$X_1\_hat = X_0 + X\_dot_0 \Delta t + X\_ddot \Delta t^2/2 \qquad (7)$$

The difference between the predicted $X_1$ and its computed value is used to find a jerk level, which brings the predicted value into agreement with the computed value:

$$\Delta X_1 = X_1 - X_1\_hat = X\_dddot \Delta t^3/6 \qquad (8)$$

Equation (7) is used to solve for the jerk value (X_dddot), and this is used in the Equation (8) to interpolate for the GPS satellite position:

$$X(t) = X_0 + X_0\_dot(t-t_0) + X_0\_ddot(t-t_0)^2/2 + X_0\_dddot(t-t_0)^3/6 \qquad (9)$$

Figure 14:
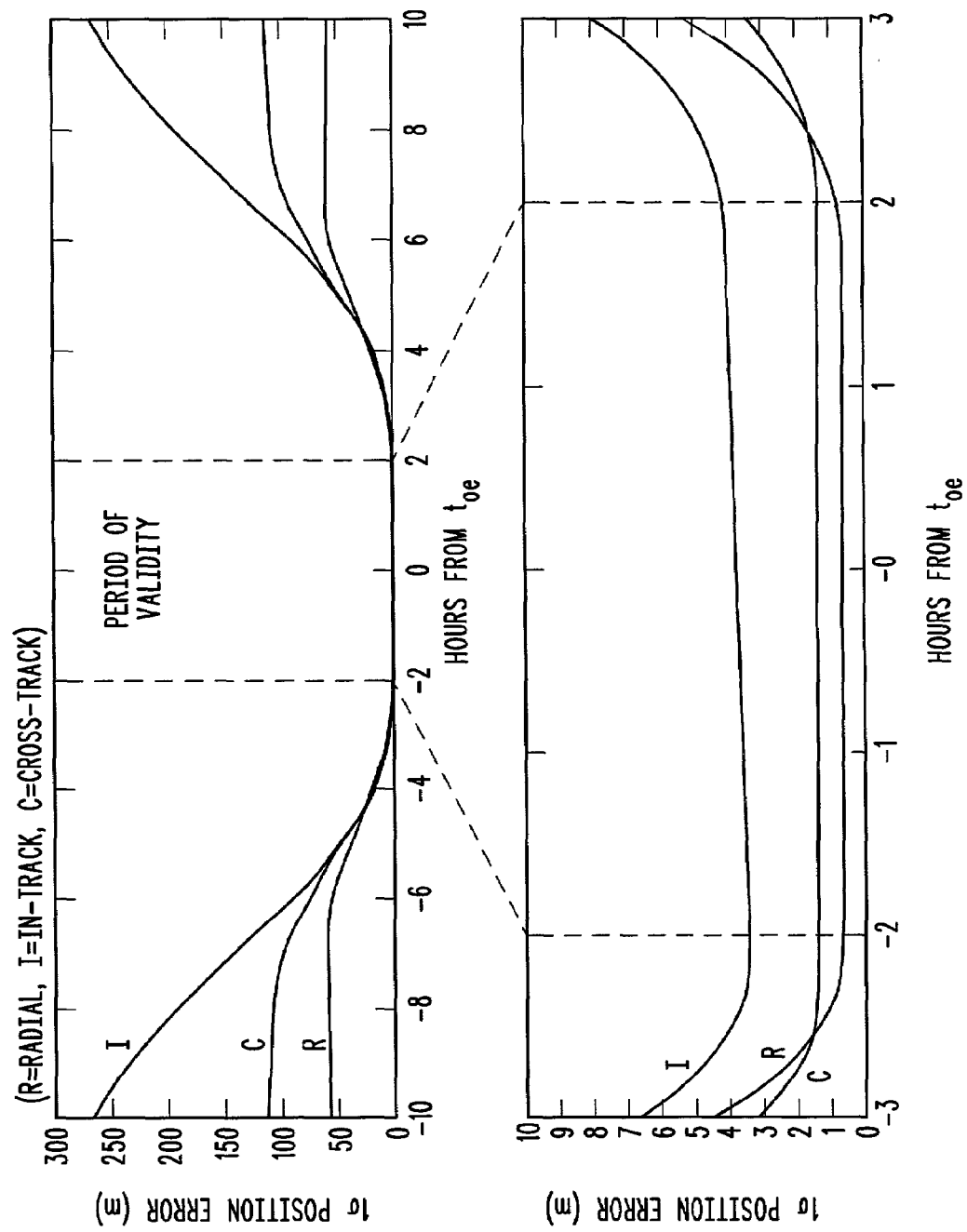
FIG. 14 is a diagram of actual and estimated satellite positions in accordance with the preferred embodiment of the present invention.

Note that the satellite clock correction data is absent from this broadcast message. This is enabled by appropriately modifying the position and velocity data which is sent to absorb the clock error effects as illustrated in FIG. 14. FIG. 14 illustrates estimated and actual satellite positions, wherein provision is made for combining the satellite position curve fit data with the satellite clock correction parameters. This permits elimination of the clock correction parameters completely and reduces even further the number of bits to be transmitted from 254 bits to 217 bits per satellite. In order to accomplish this, the effect of the clock error must be translated into an equivalent satellite position error.

In FIG. 14, a satellite 804 of a global navigation positioning system such as GPS orbits above a radio communication system. The radio communication system includes a plurality of base stations 802 in two-way radio communication with mobile stations such as mobile station 800. Translating the effect of clock error into equivalent satellite position error requires that the satellite orbit curve fit X(t) be modified by an amount corresponding to the satellite clock correction. Effective range extensions $C_0$, $C_1$, and $C_2$ are computed from the satellite clock correction as derived from the ephemeris data at time $t_0$, $t_1$, and $t_2$ multiplied by the speed of light (SOL). This magnitude can be either positive (farther away) or negative (closer to the mobile station), but typically is on the order of less than 1 ms (but can be has large as 5 ms).

The effective position XE'(t) is calculated as follows:

$$XE'(t_0) = X(t_0) + C(t_0)SOL\left(\frac{X(t_0) - R}{|X(t_0) - R|}\right) \qquad (10)$$

In order to modify the effective satellite orbit, a reference point "RL" is required to project the satellite orbit position along the line extending between its true position X(t) and the RL. The RL can conveniently be the base station 802. Simple vector mathematics modifies the satellite orbit path X(t) to the modified orbit path X'(t).

Choosing each individual base station of the system as the reference site allows for control of the error induced in the range measurement. It is assumed that the base station 802 is within 10 Km of the mobile station 800 (valid most of the time in cellular systems). Also, it is known that the satellite clock correction cannot be any larger than 5 ms, since this is the maximum magnitude of the parameter. The maximum error in satellite predicted range is a function of this clock error and the base station-to-mobile-station separation distance. The maximum error in the measured range based on the modified or projected satellite orbit, a 10 Km mobile to reference point distance, and 5 ms of clock correction is approximately 1 meter, which is acceptably small given other system errors such as multipath, receiver noise, ionospheric delay, and other quantization effects.

A cellular network protocol which supports both broadcast and point-to-point messaging in support of an Integrity Monitor (IM) for assisted GPS based positioning for cellular handsets has been specified. It can be seen that the present invention has several advantages over current solutions. Two aspects of the Integrity Monitor of the present invention that improve the reliability of assisted GPS based positioning are: the first aspect monitors the quality of the DGPS corrections and informs DGPS users of the measurement quality degradation, e.g., when unexpected levels of multipath error are present; and the second aspect warns mobile handsets of GPS satellite failures by isolating them from these failures, and is required for all types of GPS users, i.e., MS assisted, MS-based, and autonomous. In addition, messaging structures and protocols have been defined that support the IM function in accordance with the preferred embodiment of the present invention.

Although the invention has been described and illustrated in the above description and drawings, it is understood that this description is by way of example only and that numerous changes and modifications can be made by those skilled in the art without departing from the true spirit and scope of the invention. For example, while the present invention has been presented in the preferred and an alternate embodiment in the confines of a GSM cellular system, the invention could be implemented in other radio communication systems. Therefore, our invention should be limited only by the following claims.

What is claimed is:

1. A method for maintaining the integrity of a mobile handset's location determination in a system comprising the mobile handset, radio communication infrastructure and a Differential Global Positioning System (DGPS) reference receiver coupled to the radio communication infrastructure and installed at a predetermined location, the DGPS reference receiver receiving GPS information from a plurality of GPS satellites, the method comprising:

said radio communication infrastructure receiving DGPS information, from which differential correction data may be obtained, from the DGPS reference receiver;

determining whether one or more of said plurality of GPS satellites have failed/are failing based on differential correction data within a specified time after failure;

generating a failed satellite message when it is determined that one or more of said plurality of GPS satellites have failed/are failing, said failed satellite message identifying the one or more of said plurality of GPS satellites that have failed/are failing; and transmitting the failed satellite message identifying the one or more of said plurality of GPS satellites that have failed/are failing when it is determined that the one or more of said plurality of GPS satellites has failed/are failing.

2. The method of claim 1 wherein determining whether one or more of said plurality of GPS satellites have failed/are failing comprises determining whether one or more of said plurality of GPS satellites have failed/are failing based on magnitudes of the differential correction data for each of said plurality of GPS satellites.

3. The method of claim 2 wherein determining whether one or more of said plurality of GPS satellites have failed/are failing comprises:

comparing said magnitudes of the differential correction data to a threshold; and determining that a GPS satellite has failed/is failing when said threshold is exceeded.

4. The method of claim 3 wherein said threshold is based upon an expected level of selective availability (SA).

5. The method of claim 4 wherein said expected level of SA is determined from a User Range Accuracy (URA) parameter communicated in said GPS information.

6. The method of claim 3 generating a differential correction message by excluding differential correction data corresponding to one or more of said plurality of GPS satellites when it is determined that the one or more of said plurality of GPS satellites have failed/are failing; and transmitting the differential correction message to said mobile handset.

7. The method of claim 1, determining whether one or more of said plurality of GPS satellites have failed/are failing based on the differential correction data from a single reference station.

8. A method for maintaining the integrity of a mobile handset's location determination in a radio communication system, the method comprising:

determining whether one or more of a plurality of satellite positioning system satellites have failed/are failing based on a magnitude of DGPS correction information for any satellite exceeding a threshold;

generating an integrity message identifying which of said plurality of satellite positioning system satellites have failed/are failing; and transmitting the integrity message to said mobile handset.

9. The method of claim 8, determining whether one or more of said plurality of satellite positioning system satellites have failed/are failing within a specified time after failure.

10. The method of claim 8, transmitting the integrity message as a broadcast integrity message addressing more than one mobile handset.

11. The method of claim 8, transmitting the integrity message as a point-to-point integrity message addressing a particular mobile handset.

12. The method of claim 8 wherein generating an integrity message comprises generating an integrity message identifying at least one of said plurality of satellite positioning system satellites as having failed/are failing for a predetermined time interval.

13. A satellite positioning system integrity maintenance method in a mobile handset, comprising:

receiving differential correction data for said mobile handset;

determining whether any satellite of the satellite positioning system has failed, including whether any satellite is failing, based on the differential correction data;

excluding information from any failed and failing satellites from mobile handset position solution determinations.

14. The method of claim 13, determining whether any satellites have failed, including whether any satellite is failing, by considering magnitudes of the differential correction data.

15. The method of claim 14, determining whether any satellite has failed, including whether any satellite is failing, by comparing said magnitudes of the differential correction data to a threshold.

16. The method of claim 13, determining whether any satellite has failed, including whether any satellite is failing, by considering a selective availability (SA) level.

17. The method of claim 16, determining the SA level from a User Range Accuracy (URA) parameter.

18. A method for maintaining integrity of a satellite positioning system based location fix in a cellular communications network, comprising:

determining whether any satellite of the satellite positioning system has failed, including whether any satellite is failing by considering a magnitude of residuals of a position solution of each satellite in the satellite positioning system;

if a satellite has failed, including if any satellite is failing, generating an integrity message at a single reference station in the cellular communications network, the integrity message identifying the satellite that has failed/is failing; and transmitting the integrity message from infrastructure of the cellular communications network to cellular mobile stations in the cellular communications network.

19. The method of claim 18, determining the magnitude of said residuals of said position solution by deriving them from a set of pseudo ranges generated by a satellite receiver.

20. The method of claim 18, transmitting the integrity message as a broadcast integrity message addressing more than one mobile handset.

21. The method of claim 18, transmitting the integrity message as a point-to-point integrity message addressing a particular mobile handset.

22. The method of claim 18, identifying the failed or failing satellite as having failed or are failing for a predetermined time interval.

23. The method of claim 18, determining whether a satellite of the satellite positioning system has failed, including whether any satellite is failing, within a specified time after the failure.

* * * * *